US011216412B2

(12) United States Patent
Congnan et al.

(10) Patent No.: US 11,216,412 B2
(45) Date of Patent: Jan. 4, 2022

(54) INTELLIGENT MERGING FOR EFFICIENT UPDATES IN COLUMNAR DATABASES

(71) Applicant: Alibaba Group Holding Limited, George Town (KY)

(72) Inventors: Luo Congnan, Sunnyvale, CA (US); Fang Zheng, Sunnyvale, CA (US); Cheng Zhu, Sunnyvale, CA (US); Xiaowei Zhu, Sunnyvale, CA (US); Ruiping Li, Sunnyvale, CA (US)

(73) Assignee: Alibaba Group Holding Limited

( * ) Notice: Subject to any disclaimer, the term of this patent is extended or adjusted under 35 U.S.C. 154(b) by 0 days.

(21) Appl. No.: 16/742,727

(22) Filed: Jan. 14, 2020

(65) Prior Publication Data

US 2021/0216498 A1 Jul. 15, 2021

(51) Int. Cl.
*G06F 16/00* (2019.01)
*G06F 16/11* (2019.01)
*G06F 16/18* (2019.01)
*G06F 16/23* (2019.01)

(52) U.S. Cl.
CPC ............ *G06F 16/119* (2019.01); *G06F 16/18* (2019.01); *G06F 16/23* (2019.01)

(58) Field of Classification Search
CPC ......... G06F 16/119; G06F 16/18; G06F 16/23
See application file for complete search history.

(56) References Cited

U.S. PATENT DOCUMENTS 8,127,095 B1 * 2/2012 Colgrove ............ G06F 11/1435 711/162
8,280,853 B1 * 10/2012 Lai ........................ G06F 16/113 707/651
2013/0159248 A1 6/2013 Mueller
2015/0095307 A1 * 4/2015 Bensberg .............. G06F 16/278 707/714
2019/0171370 A1 * 6/2019 Kedia ................... G06F 3/0649
2021/0034273 A1 * 2/2021 Perneti .................. G06F 3/0647

OTHER PUBLICATIONS

Abadi et al., The Design and Implementation of Modem Column-Oriented Database Systems, Foundations and Trends in Databases, 2012, pp. 197-280, vol. 5, No. 3.
Author Unknown, The Vertica Analytic Database Technical Overview White Paper a DBMS Architecture Optimized for Next-Generation Data Warehousing, Mar. 2010.
(Continued)

*Primary Examiner* — Diedra McQuitery
(74) *Attorney, Agent, or Firm* — Van Pelt, Yi & James LLP

(57) ABSTRACT

Intelligent merging for efficient updates in columnar databases are disclosed, including: determining a current age associated with a row in a database, wherein the database comprises a write storage and a read storage, wherein the row is located in the write storage; determining a set of one or more merge criteria based at least in part on a modification age distribution, wherein the modification age distribution is dynamically determined based at least in part on previous transactions at the database; determining whether the current age meets the set of merge criteria; and in response to a determination that the current age meets the set of merge criteria, merging the row from the write storage into the read storage.

20 Claims, 16 Drawing Sheets

(56) References Cited

OTHER PUBLICATIONS

Andrew Hutchings, MariaDB Columnstore Understanding the Architecture, 2018, https://www.slideshare.net/MariaDB/m18-understanding-the-architecture-of-mariadb-columnstore.
Author Unknown, Columnar Store for Analytics with Postgres, GitHub, 2017, https://github.com/citusdata/cstore_fdw.
Author Unknown, ColumnStore Data Ingestion, MariaDB, 2019, https://mariadb.com/kb/en/library/columnstore-data-ingestion/.
Author Unknown, Confidence Interval, Wikipedia, Sep. 26, 2019, https://en.wikipedia.org/wiki/Confidence_interval.
Author Unknown, Greenplum Database, GitHub, Sep. 26, 2019, https://github.com/greenplum-db/gpdb.
Author Unknown, Greenplum, Wikipedia, Sep. 21, 2019, https://en.wikipedia.org/wiki/Greenplum.
Author Unknown, MariaDB ColumnStore, MariaDB, 2019, https://mariadb.com/kb/en/library/mariadb-columnstore/.
Author Unknown, The Column-Store Pioneer, MonetDB, Sep. 26, 2019. https://www.monetdb.org/Home.

* cited by examiner

300

| | | | | |
|---|---|---|---|---|
| Transaction ID: 8 | Value A | Value B | Value C | 302 |
| Transaction ID: 9 | Value D | Value E | Value F | 304 |
| ... | ... | ... | ... | |

FIG. 3

| Transaction ID: 8 | Value A | Value B | Value C |
|---|---|---|---|
| Transaction ID: 9 | Value D | Value E | Value F |
| ⋮ | ⋮ | ⋮ | ⋮ |
| Transaction ID: 34 | Value A | Value G | Value C |
| ⋮ | ⋮ | ⋮ | ⋮ |

1600

| Transaction ID: 8 | Value A | Value B | Value C | 1602 |
|---|---|---|---|---|
| Transaction ID: 9 | Value D | Value E | Value F | 1604 |
| ... | ... | ... | ... | |
| Transaction ID: 34 | Value A | Value G | Value C | 1606 |
| ... | ... | ... | ... | |
| Transaction ID: 40 | Value D | Value T | Value Q | 1608 |
| ... | ... | ... | ... | |

INTELLIGENT MERGING FOR EFFICIENT UPDATES IN COLUMNAR DATABASES

BACKGROUND OF THE DISCLOSURE

One popular implementation for a column-oriented database engine is to have a WRITE store and a READ store. Usually, the WRITE store accepts all the INSERT operations and then the data will be moved to the READ store periodically later. The WRITE store could be a regular row-oriented table or a column-oriented table. It may reside in memory or disk. In general, the row-oriented table favors INSERT, UPDATE, and DELETE operations much more than a column-oriented table does, because these operations work on whole rows of data. Therefore, many of the columnar implementations use a regular Atomicity, Consistency, Isolation, and Durability (ACID)-compliant row-oriented table as their WRITE store. When a row is inserted into a columnar database, it first goes to the WRITE store. Then a background database process, usually called a merge process, will automatically merge the rows (sometimes called "tuples") from the WRITE store to the column-oriented READ store. In the processing of a query, both the WRITE store and the READ store are searched and their results may be combined.

Typically, rows are merged from the WRITE store into the READ store based on a static policy. One example of a static policy may include merging all rows from the WRITE store into the READ store at a fixed interval of time. However, merging rows from the WRITE store into the READ store based on a static policy is inflexible and overlooks the differences among different rows in the WRITE store. One such difference among the rows in the WRITE store is whether they are still likely to be updated. For example, it would not be desirable to merge rows into the READ store that are still likely to be updated, because it is computationally cheaper to update those rows in the WRITE store than it is to update those rows in the READ store.

BRIEF DESCRIPTION OF THE DRAWINGS

Various embodiments of the disclosure are disclosed in the following detailed description and the accompanying drawings.

FIG. 3 is a diagram showing example rows in a write storage.

DETAILED DESCRIPTION

Figure 1:
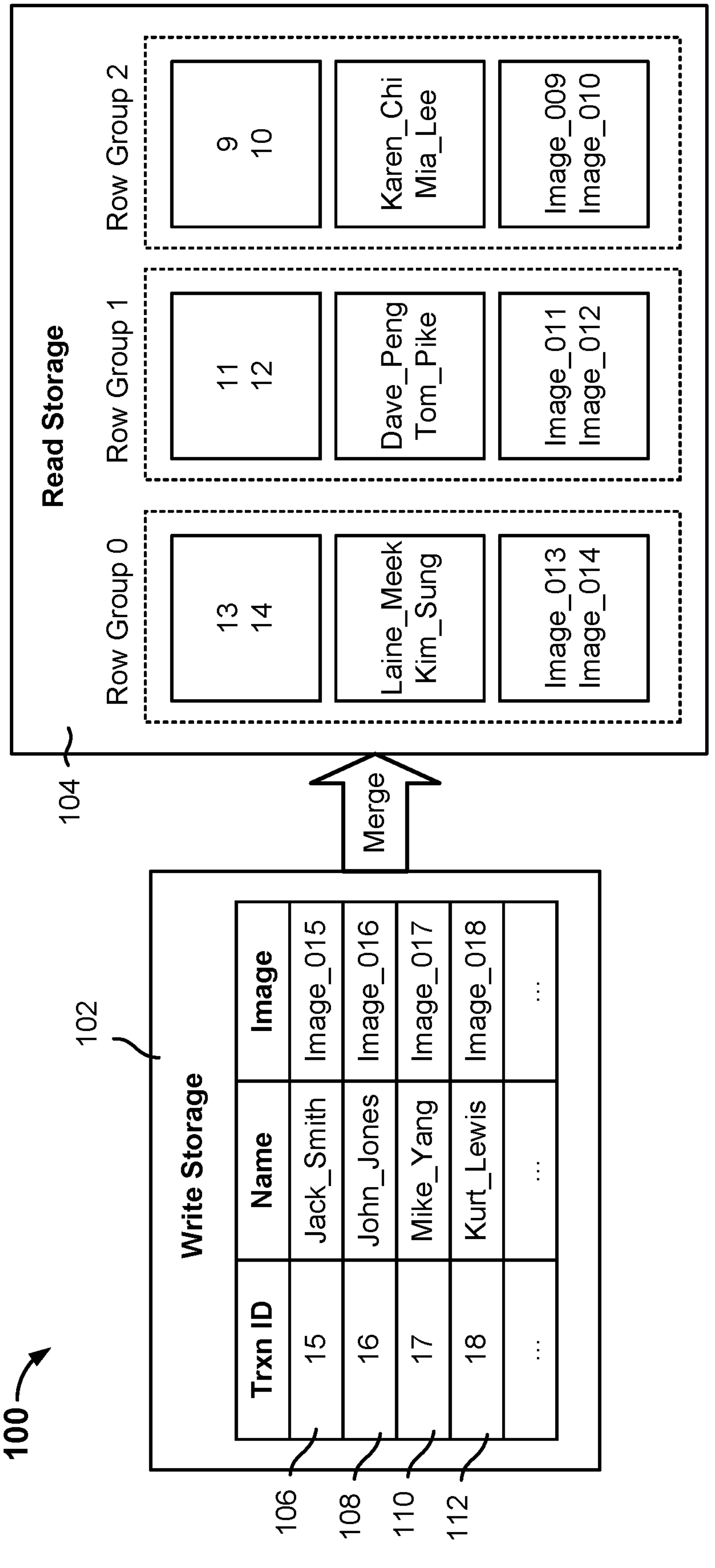
FIG. 1 is a diagram showing an embodiment of a columnar database.

The disclosure can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the disclosure may take, may be referred to as techniques. In general, the order of the steps of disclosed processes may be altered within the scope of the disclosure. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the disclosure is provided below along with accompanying figures that illustrate the principles of the disclosure. The disclosure is described in connection with such embodiments, but the disclosure is not limited to any embodiment. The scope of the disclosure is limited only by the claims and the disclosure encompasses numerous alternatives, modifications and equivalents. Numerous specific details are set forth in the following description in order to provide a thorough understanding of the disclosure. These details are provided for the purpose of example and the disclosure may be practiced according to the claims without some or all of these specific details. For the purpose of clarity, technical material that is known in the technical fields related to the disclosure has not been described in detail so that the disclosure is not unnecessarily obscured.

Embodiments of intelligent merging for efficient updating in columnar databases are described herein. A current age associated with a row in a database is determined. In various embodiments, the "current age" of a row is the length of time that the row has been in the write storage portion of the database since it was added to the database. The database includes a write storage that is used to store recent data and a read storage that is used to store non-recent data. For example, new data and updated data are added to the write storage and data in the write storage is to be eventually merged into the read storage. New and updated data that are added into the write storage may be referred to as "recent data" and data that has been merged/input into the read storage may be referred to as "non-recent data." The row for which the current age is determined is located in the write storage. A set of merge criteria is determined based at least in part on a modification age distribution. The modification age distribution is dynamically determined based on previous transactions performed at the database. In various embodiments, a modification age distribution is generated based on the ages of rows at which they are first updated/modified in the write storage. In various embodiments, the set of one or more merge criteria that is determined from the modification age distribution includes a threshold merge age. Whether the current age meets the set of merge criteria is determined. In some embodiments, if the set of merge criteria includes a threshold merge age, then the row can only be merged from the write storage to the read storage if its current age is greater than at least the threshold merge age. In response to a determination that the current age meets the set of merge criteria, the row is merged from the write storage into the read storage.

FIG. 1 is a diagram showing an embodiment of a columnar database. In the example of FIG. 1, database system 100 includes write storage 102 and read storage 104. Write storage 102 is configured to store data that was recently added into database 100. As will be described in further detail below, data that is stored in write storage 102 is eventually merged into the non-recent (historical) data that is stored in read storage 104. In some embodiments, database system 100 may be referred to as "columnar" because its data is (eventually) stored in a column-oriented format. In some embodiments, write storage 102 is sometimes referred to as a "delta storage." In some embodiments, read storage 104 is sometimes referred to as a "historical storage."

In the example of FIG. 1, write storage 102 comprises a row-oriented table. In a row-oriented table, data is stored row-by-row. In some embodiments, the columns of a single row are physically placed together (e.g., contiguously in physical storage). This is designed to efficiently access the data of an entire row in as few disk I/O as possible, and is commonly used for transactional queries (e.g., Online Transactional Processing (OLTP)). In some embodiments, write storage 102 resides in memory to allow for faster accesses.

In the example of FIG. 1, read storage 104 comprises a column-oriented table. In a column-oriented table, data is stored column-by-column. In some embodiments, the values of one column from all the rows (a "row" is also sometimes referred to as a "tuple") in a table are placed together (e.g., contiguously in physical storage). This is designed to efficiently support analytical queries which are often only interested in a subset of columns from a table, but not all. With a column-oriented storage, data of a particular column or a few columns can be retrieved without wasting I/O on the columns that are not needed. In addition, the compression on the values of a column can be more effective too because they are of the same type. This has been proven to be a huge savings on I/O cost for many typical analytical queries (Online Analytical Processing (OLAP)). In some instances, a pure column-oriented storage stores columns in separate files. Each column's file is usually further divided into blocks and each block is stored in compressed form. During query processing, data is read back from files into memory in units of blocks. However, as the values of all the columns of a single row spread across the disk in the column-oriented storage, accessing a particular row will request N disk blocks if there are N columns in the table. Unfortunately, many typical OLTP queries often request such operations.

To address this inefficiency, a variant of the column-oriented approach can be used. It is called "row group columnar storage" or "hybrid row-column storage." A hybrid row-column storage first divides tuples (i.e., rows) into groups. Then, the column-oriented storage is applied to each single group of rows. Depending on the group size, accessing a particular row will request fewer data blocks than the pure column-oriented storage, because the column values of a tuple are now located closer to each other. Thus, the row-column hybrid storage also performs well for OLTP queries, while it still gets a great deal of benefit brought by the column-oriented storage that is applied on each group. As a result, it is often a superior option for the mixing workload of both OLTP and OLAP. In various embodiments, "column-oriented storage" or "columnar storage" refers to both the pure column-oriented storage and its row-column ("row group") variant.

In some embodiments, for each column in a row group of read storage 104, a "nullness" bitmap is stored. In some embodiments, a nullness bitmap contains as many number of bits as the number of rows in the row group, and the i-th bit in the nullness bitmap indicates whether the corresponding i-th value in the column is NULL or not. In some embodiments, the nullness bitmap may be stored in a compressed form. In some embodiments, for each row group of read storage 104, a "delete" bitmap is also stored. In some embodiments, a delete bitmap contains as many number of bits as the number of rows in the group, and the i-th bit in the delete bitmap indicates whether the corresponding i-th row in the group has been deleted. Initially, a delete bitmap has all bits set to zero. In some embodiments, a delete bitmap may be stored in certain compressed form.

In some embodiments, when a row of data is added to a database table, the row of data is added to write storage 102. For example, a row to be added includes a column value (which could be a NULL or a non-NULL value) corresponding to each column of the database table. For example, adding a row to a database table is performed using INSERT or UPDATE SQL statements. As such, write storage 102 is used to efficiently absorb a continuous flow of updates with potentially, dynamically changing access patterns.

Write storage 102 is used to address the challenge of accommodating a high ingestion rate of new data with a low ingestion latency requirement. For example, many terabytes of data may need to be inserted into database system 100 per day. As such, in some embodiments, write storage 102 is used to implement a row-oriented table to serve the role of the WRITE store. The newly inserted data will be first placed in the row-oriented write storage 102. Later, once a certain number of rows/tuples are accumulated in write storage 102, the rows/tuples will be automatically merged into its column-oriented read storage 104 in batches.

Another challenge that database system 100 faces is that many applications also need to perform a large number of update operations on the data. This can drag down the overall performance of database system 100 when much of the data to be updated has already been merged into/stored at read storage 104 and therefore, stored in the column-oriented format. A typical example of such a scenario in real-life is: a sales event on a shopping platform that lasts for a limited time period (e.g., a few hours). As new transaction data is flowing into database system 100, some might be later updated due to the nature of the business. For example, a new row corresponding to a shopping transaction is inserted into write storage 102 when a customer purchases one or more products at the platform. Later, the shopping transaction may be updated when, for example, an item included in the shopping transaction is cancelled/removed from the shopping transaction, which results in a new version of the row being inserted into write storage 102. It is observed that some updates often share one common pattern: they occur in a short period of time after the insertion of the original transaction/row has been performed. Once that period is over, the transaction/row can settle down and is unlikely to be updated/modified again.

When row-oriented format tuples in write storage 102 are merged to its column-oriented read storage 104, they are "de-tupled" into a group of column values. In various embodiments, "de-tupling" is the operation to decompose a row into multiple column values. By de-tupling, each of the values is appended to their corresponding blocks in column-oriented read storage 104. For example, assume that a table has 4 columns (e.g., student name, student id, class, score). To insert a row to this example table, the value of each of the 4 columns is extracted from the row, one by one, and each value is appended to the corresponding block of the table's columnar storage in column-oriented read storage 104. Each column typically has its own physical file. The column values of a row will be appended to their corresponding read storage 104 column-specific files, respectively. As such, to update a row that has already been merged from write storage 102 into read storage 104, the following reverse work is needed to be done: the column values are read from read storage 104's column-specific files, the row is rebuilt, the update is performed on the rebuilt row, and then the new row is inserted back into write storage 102. Compared with updating a row in write storage 102, which involves inserting a new row into write storage 102 with the updated data, updating a row in read storage 104 is clearly a much more computationally expensive operation. Therefore, it is desirable to avoid merging a row from write storage 102 into read storage 104 before it is expected that the row will (likely) be updated. Put another way, it is desirable to merge a row from write storage 102 into read storage 104 only after the row is no longer expected to be updated.

One naïve solution for avoiding merging of rows that are still expected to be updated in write storage 102 is to merge rows from write storage 102 in the order in which they were inserted. This is based on the assumption that younger rows are more likely to be updated than older rows. Another naïve solution is to allow users to control the pace of merging by configuring the time interval between consecutive merge processes. This is usually the default merge policy of many columnar databases and it works for simple cases but it fails to handle the cases where the update operations are continuously made and have dynamic patterns. For example, during the business peak time in a day, most rows of a table could be updated in less than 5 seconds once they are inserted, but the average time at which rows are updated after they are inserted is 30 seconds for other periods of time during the day. Consider a Massive Parallel Processing (MPP) database with tens of computation nodes, the hot data and cold data could be processed in different nodes, and as such, a global and static configuration for when to merge data or which rows of data to merge will not work for all nodes. Manually setting a merge policy for each single node by a user is also impractical.

Embodiments of determining, at runtime, when a row should be merged from write storage 102 to read storage 104 are described herein. As will be described in further details below, in various embodiments, a model (which is sometimes referred to as the "modification age distribution") of at what ages rows in write storage 102 are updated is generated based on observing when update-types of transactions/operations are performed at write storage 102. Then, a set of merge criteria, including at least a threshold merge age, is determined using the modification age distribution. During a merge event (which may occur on a periodic basis or in response to a user request), database system 100 is configured to determine a current age of each row in write storage 102, compare the current age against the set of merge criteria, and only if the current age of the row meets the set of merge criteria, does database system 100 merge the row into read storage 104. If the current age does not meet the set of merge criteria, database system 100 does not merge the row into read storage 104 and instead, the row remains in write storage 102 until it meets a set of merge criteria during a later merge process (or becomes deleted). In various embodiments, a new modification age distribution is generated periodically based on observations of recent update-types of transactions/operations that are performed at write storage 102.

Turning to the specific example database entries shown in FIG. 1, write storage 102 and read storage 104 of database system 100 collectively maintain data of an example database table that stores information related to employees of a company. The database table includes columns "Trxn ID" (short for "Transaction ID"), "Name," and "Image." A row of information with column values corresponding to columns "Trxn ID," "Name," and "Image" pertains to a corresponding employee. When new rows of employee information are inserted into the employee information database table, they are added directly to write storage 102. Each transaction at database system 100, regardless of the operation (e.g., INSERT, UPDATE, DELETE), is associated with a corresponding transaction identifier (ID). Transaction IDs in a database system are monotonically increasing. So, for example, if a first row is inserted into write storage 102 and that transaction has transaction ID "10," then a second row that is inserted into write storage 102 immediately after the first row will be assigned a transaction ID of "11." In some embodiments, the last used transaction ID is tracked (e.g., written in a log file) and when database system 100 is restarted, the last used transaction ID is obtained to determine the next transaction ID to assign to the next transaction.

Over time, the rows stored in write storage 102 are to be merged into the column-oriented storage of read storage 104. In various embodiments, merging rows from write storage 102 into read storage 104 includes converting row-oriented data into column-oriented data. In the example of FIG. 1, read storage 104 employs row groups (Row Groups 0, 1, and 2). Specifically, as shown in FIG. 1, each example row group includes column values of two rows and where column values belonging to the same column can be compressed together into a grouped value and stored separately from column values belonging to other columns. In some embodiments, to save on storage space, the column values of each row group are compressed together and stored as a compressed value.

As mentioned above, when a row that is located in read storage 104 is to be updated, many operations are performed. For example, updating a row in read storage 104 may include one or more of the following: decompressing the row's corresponding compressed column values (e.g., belonging to various row groups), reassembling its column values into the row, updating the reassembled row, inserting the updated version of the row back into write storage 102, and setting flag(s) on relevant delete bitmaps corresponding to the row so that the row can eventually be deleted from read storage 104. In contrast, when a row that is located in write storage 102 is to be updated, fewer operations are performed. For example, updating a row in write storage 102 may include one or more of the following: inserting a new row with the updated data into write storage 102 and linking the new row to the previous version of the row in write storage 102. As such, it would be desirable to avoid updating a row that has already been merged into read storage 104. Conversely, it would be preferable to allow a row to remain in write storage 102 until the row is no longer expected to be updated.

As will be described in detail further below, past transactions at write storage 102 are observed to periodically generate a current modification age distribution (to replace a previous modification age distribution). The current modification age distribution is then used to determine a current set of merge criteria. At the next merge event at database system 100, the current age of each of rows 106, 108, 110, and 112 will be determined and each such current age will be compared against the set of merge criteria to determine whether the corresponding row in write storage 102 should be merged into read storage 104 during that merge process.

Figure 2:
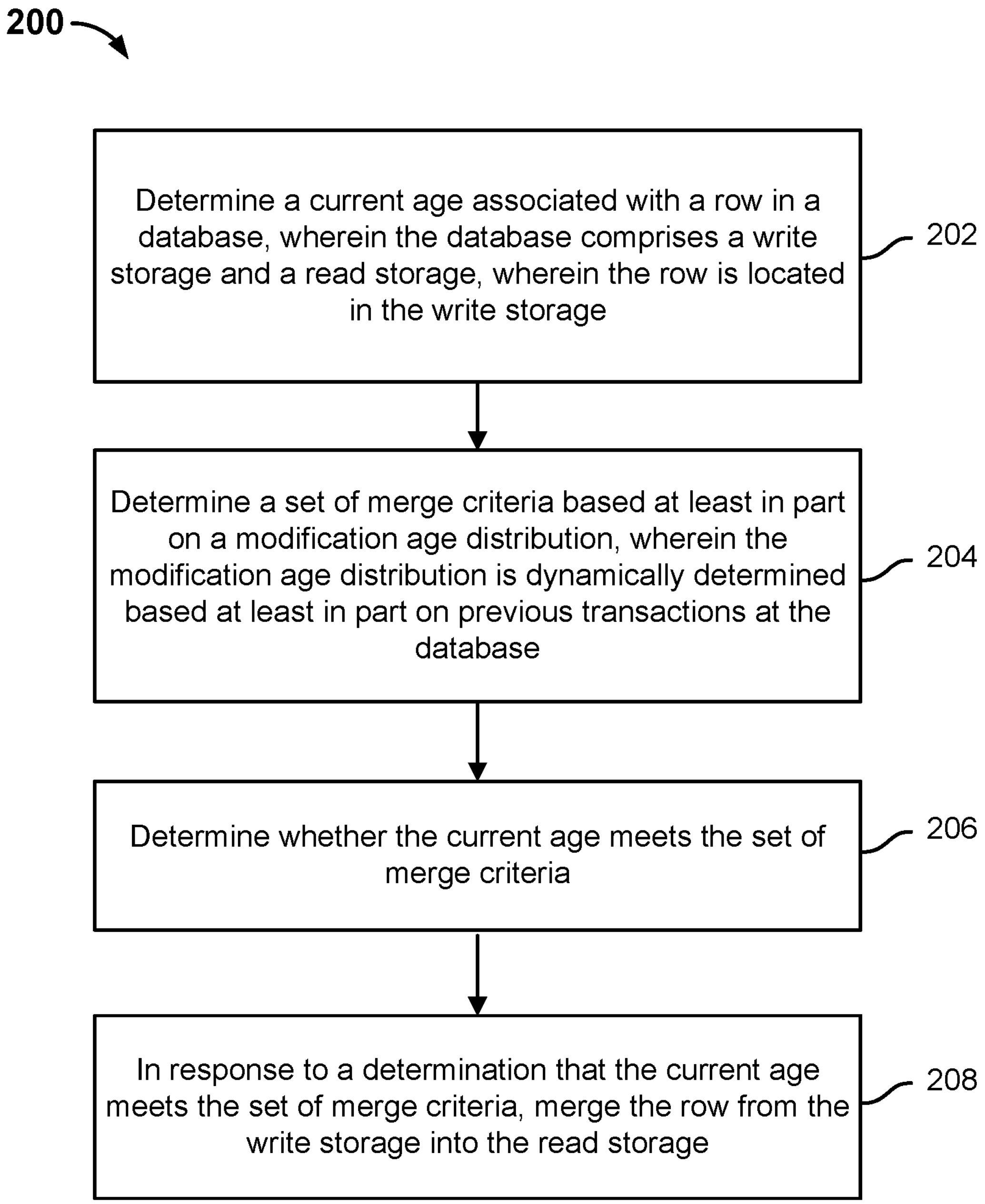
FIG. 2 is a flow diagram showing an embodiment of a process for performing intelligent merging for efficient updates in columnar databases.

FIG. 2 is a flow diagram showing an embodiment of a process for performing intelligent merging for efficient updates in columnar databases. In some embodiments, process 200 is implemented at database system 100 of FIG. 1.

At 202, a current age associated with a row in a database is determined, wherein the database comprises a write storage that is used to store recent data and a read storage that is used to store non-recent data, wherein the row is located in the write storage. As mentioned above, in various embodiments, the "current age" of a row is the length of time that the row has been in the write storage portion of the database since it was added to the database. Because it is unduly expensive to maintain the exact timestamp of when a row was inserted into/created at the write storage, in some embodiments, a set of elapse time buckets is established to track the range of transaction IDs of transactions that were performed (e.g., committed) at the database within each configurable interval of time (elapse time bucket). The transaction ID of the row in question (the transaction ID corresponding to the initial insertion of the row into the write storage) is compared against the set of elapse time buckets to determine an approximated creation time of the row. In various embodiments, an "approximate creation time" of a row is the approximate time at which the row was first added/inserted/created in the write storage. In some embodiments, the current age of the row is determined as a function of the difference between the current time and the approximated creation time of the row.

At 204, a set of one or more merge criteria is determined based at least in part on a modification age distribution, wherein the modification age distribution is dynamically determined based at least in part on previous transactions at the database. In various embodiments, a current modification age distribution is determined by computing the modification age of each row at the write storage when that row is updated for the first time and updating a distribution with the corresponding modification age. In some embodiments, the modification age of a row at the write storage is determined based on determining the approximated creation time of the row using the set of elapse time buckets and also the time at which the first update occurred. One or more statistical properties (e.g., the mean and/or the standard deviation) are determined from the modification age distribution (which may be a normal distribution, for example) and are used to determine a set of merge criteria. In various embodiments, the set of one or more merge criteria includes a threshold merge age, which is determined as a function of the mean and the standard deviation of the modification age distribution. The threshold merge age may be, for example, the cut-off age at which 95% of all rows of the modification age distribution are no longer updated at the write storage.

In some embodiments, periodically or in response to a user request, a new/current modification age distribution is generated based on the latest observations of the modification ages of first updates to rows in the write storage such that the current modification age distribution always reflects the current updating patterns at the write storage.

In some embodiments, a modification age distribution is generated by observing the modification ages of first updates to rows in the write storage for each database table as different tables may be associated with different updating patterns.

At 206, whether the current age meets the set of merge criteria is determined. In some embodiments, whether the current age meets the set of merge criteria is determined as whether the current age of the row is greater than at least the threshold merge age of the set of merge criteria.

At 208, in response to a determination that the current age meets the set of merge criteria, the row is merged from the write storage to the read storage. Otherwise, if the current age does not meet the set of merge criteria, the row is not merged from the write storage and it will remain in the write storage until a later merge event (or until it is deleted).

FIG. 3 is a diagram showing example rows in a write storage. FIG. 3 shows table 300 in a write storage of a database system (e.g., database system 100). Each operation (e.g., INSERT, UPDATE, and DELETE) at the database is associated with a unique and monotonically increasing transaction ID. Row 302 was inserted into table 300 as a result of an insert operation and is assigned "Transaction ID: 8." Row 304 was inserted into table 300 immediately after row 302 was inserted and is assigned "Transaction ID: 9."

To determine a current age of a row in the write storage of a database system, the time at which the row was initially inserted/added to the write storage is needed. However, it is expensive to store or query the database for the exact time at which a row was initially inserted/added to the write storage. Instead of storing the exact time at which each row was initially inserted/added to the write storage, in some embodiments, a set of elapse time buckets is maintained at the database to enable the time (sometimes referred to as the "creation time") at which a row was initially inserted/added to the write storage to be approximated by leveraging the monotonically increasing nature of the transaction IDs that are assigned at the database. In various embodiments, the "set of elapse time buckets" refers to a series of time buckets, each of the same configured elapse time bucket size, and also the minimum transaction ID and the maximum transaction ID that correspond to each elapse time bucket.

Figure 4:
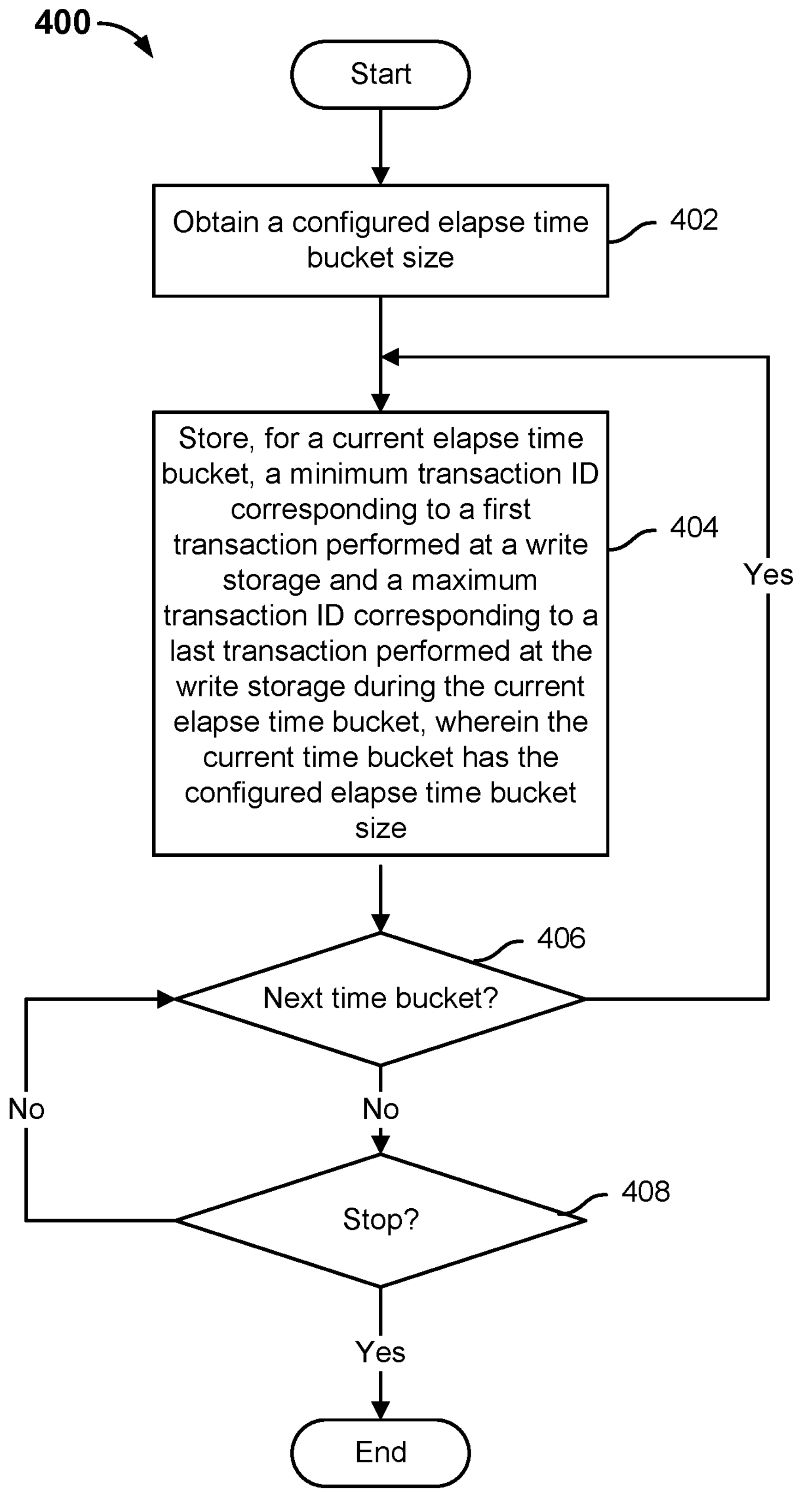
FIG. 4 is a flow diagram showing an example of a process for generating a set of elapse time buckets.

FIG. 4 is a flow diagram showing an example of a process for generating a set of elapse time buckets. In some embodiments, process 400 is implemented at database system 100 of FIG. 1.

At 402, a configured elapse time bucket size is obtained. The elapse time bucket size is configurable by a user. For example, the elapse time bucket size may be a number of seconds, minutes, and/or hours.

At 404, for a current elapse time bucket, a minimum transaction ID corresponding to an initial transaction performed at a write storage and a maximum transaction ID corresponding to a last transaction performed at the write storage during the current elapse time bucket are stored, wherein the current time bucket has the configured elapse time bucket size. For each period of time (current elapse time bucket) that is the length of the configured elapse time bucket size, given that transaction IDs of transactions performed at the database are monotonically increasing, the transaction ID of the first/initial transaction (which is the minimum transaction ID) that is performed in that period at the write storage is stored and the transaction ID of the last transaction (which is the maximum transaction ID) that is performed (e.g., committed) at the write storage in that period is stored.

At 406, whether the current elapse time bucket has ended and a new elapse time bucket has begun is determined. In the event that the current elapse time bucket has ended and a new elapse time bucket has begun, control is returned to 404. Otherwise, in the event that the current elapse time bucket has not ended and a new elapse time bucket has not yet begun, control is transferred to 408. If the time period associated with the current elapse time bucket has elapsed, then a new current elapse time bucket is determined to have begun. For example, if the current elapse time bucket were from 10 to 20 minutes (e.g., from when the database system started running), then at 21 minutes (e.g., from when the database system started running), a new elapse time bucket would have started.

At 408, whether process 400 is to be stopped is determined. In the event that the process is to be stopped, the process ends. Otherwise, in the event that the process is not to be stopped, control is returned to 406. For example, process 400 may be stopped if the database system loses power.

A set of elapse time buckets as determined by a process such as process 400 of FIG. 4 may be determined for each table in a database.

Figure 5:
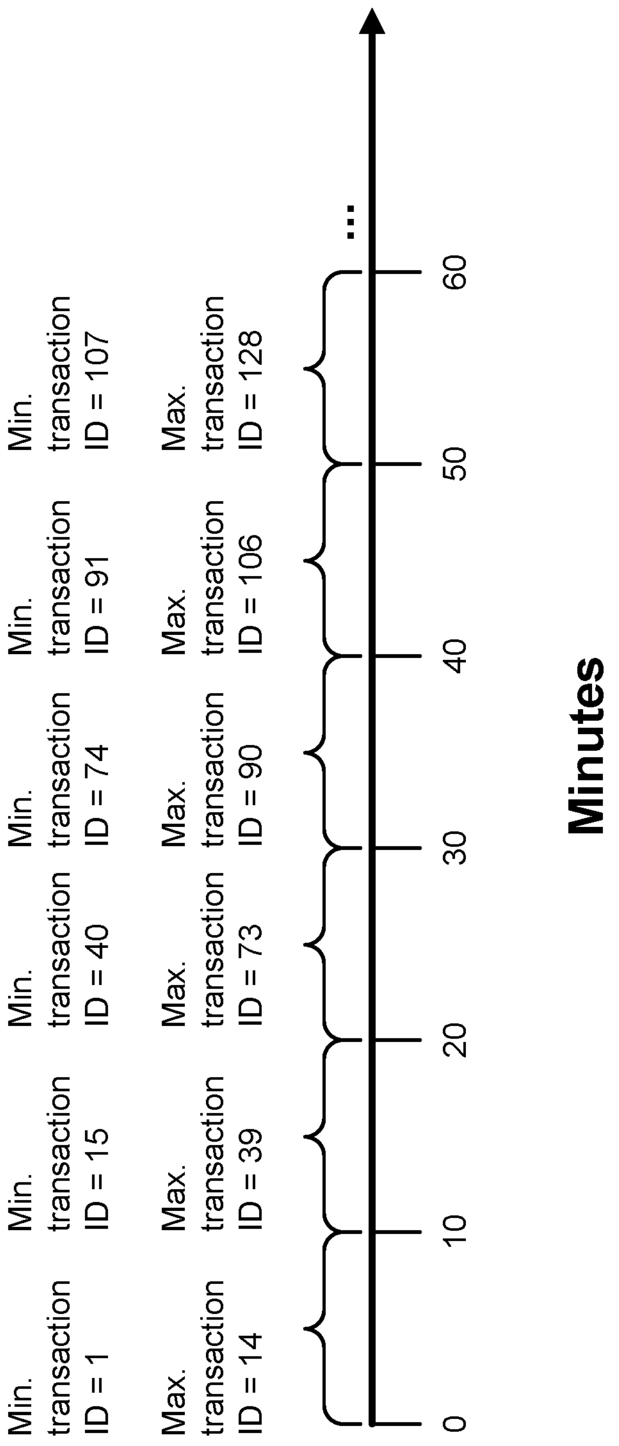
FIG. 5 is a diagram showing a set of elapse time buckets.

FIG. 5 is a diagram showing a set of elapse time buckets. The example of FIG. 5 shows a set of six elapse time buckets, where the size of each elapse time bucket is 10 minutes (10 minutes was configured by a user). The first elapse time bucket started at 0 minutes (e.g., since the table was created in the database or since elapse time buckets were maintained or since the database system has been running). Each elapse time bucket can be identified by the range of minutes that they span. Each elapse time bucket also corresponds to a pair of minimum and maximum IDs of transactions that were performed (e.g., committed) in the write storage during that elapse time bucket. The pair of minimum and maximum IDs of transactions that were performed during an elapse time bucket can be thought of as defining a range of transaction IDs of transactions that were performed during that elapse time bucket. For example, the first "0 to 10 minutes" elapse time bucket is associated with the minimum transaction ID of 1 and the maximum transaction ID of 14, the second "10 to 20 minutes" elapse time bucket is associated with the minimum transaction ID of 15 and the maximum transaction ID of 39, and so forth.

The set of elapse time buckets (e.g., such as the ones shown in FIG. 5) may be stored in any appropriate data structure. In some embodiments, the set of elapse time buckets are stored in an array. Specifically, in some embodiments, the set of elapse time buckets are stored in a circular array, as is described in FIG. 6, below.

Figure 6:
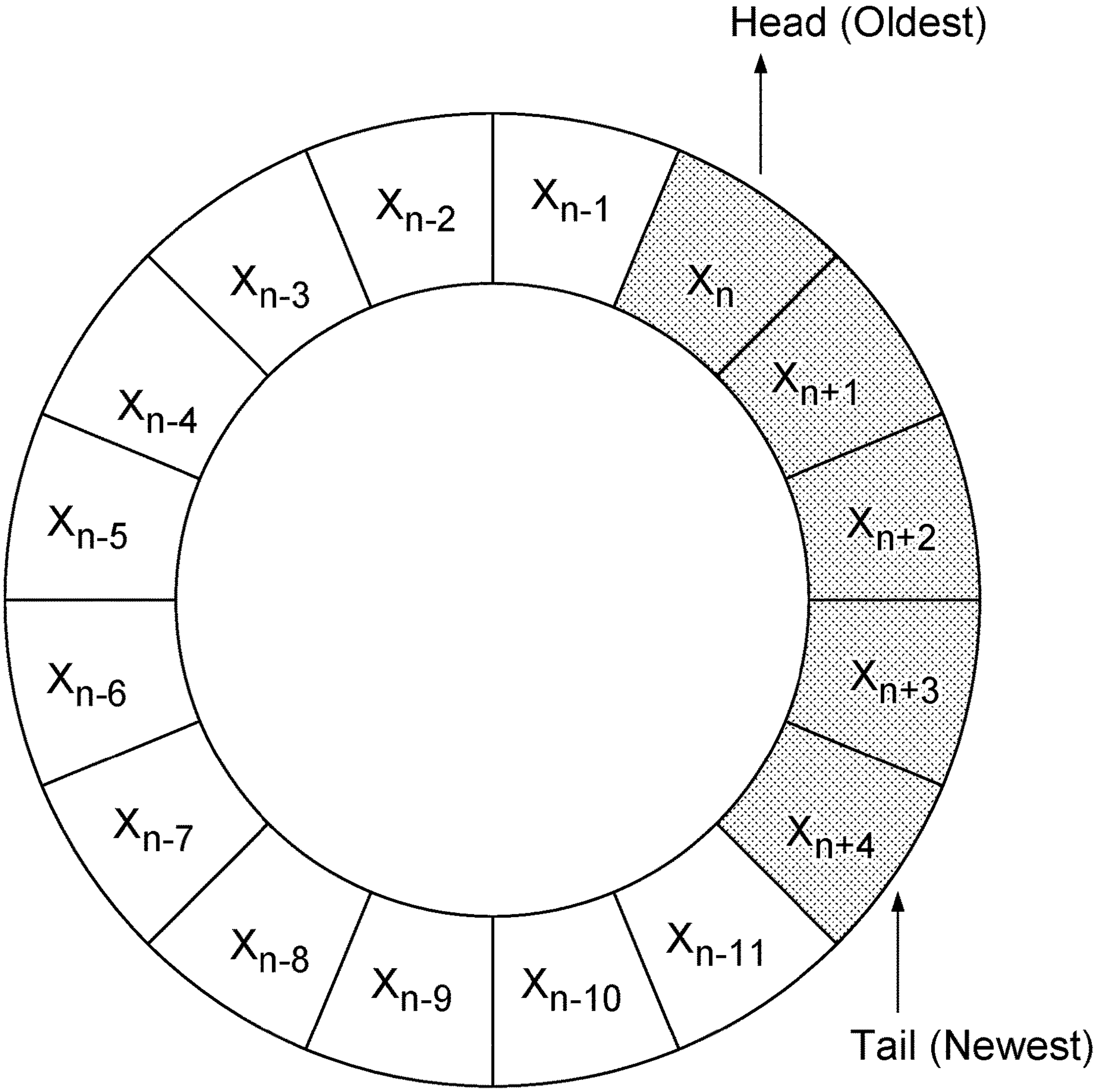
FIG. 6 is a diagram showing an example of a circular array that can be used to store a set of elapse time buckets.

FIG. 6 is a diagram showing an example of a circular array that can be used to store a set of elapse time buckets. One advantage of storing the set of elapse time buckets in a circular array is that, over time, information (e.g., the time range, the minimum transaction ID, and the maximum transaction ID) associated with older time buckets can be overwritten with information associated with newer time buckets, thereby reducing the amount of storage space that is needed to store the set of elapse time buckets. For example, if the bucket size is 10 minutes, and the database system has been running for 50 minutes, then $x_n$ represents the first 10 minute bucket, and $x_{n+4}$ represents the fifth 10 minute bucket, and so forth. As time elapses, if the tail of the circular array reaches the head, then the information stored in the head entry will be discarded and overwritten with information corresponding to the most recent elapse time bucket.

As will be described in detail below, the set of elapse time buckets will be referred to when determining a (e.g., modification and current) age of a row in the write storage.

Figure 7:
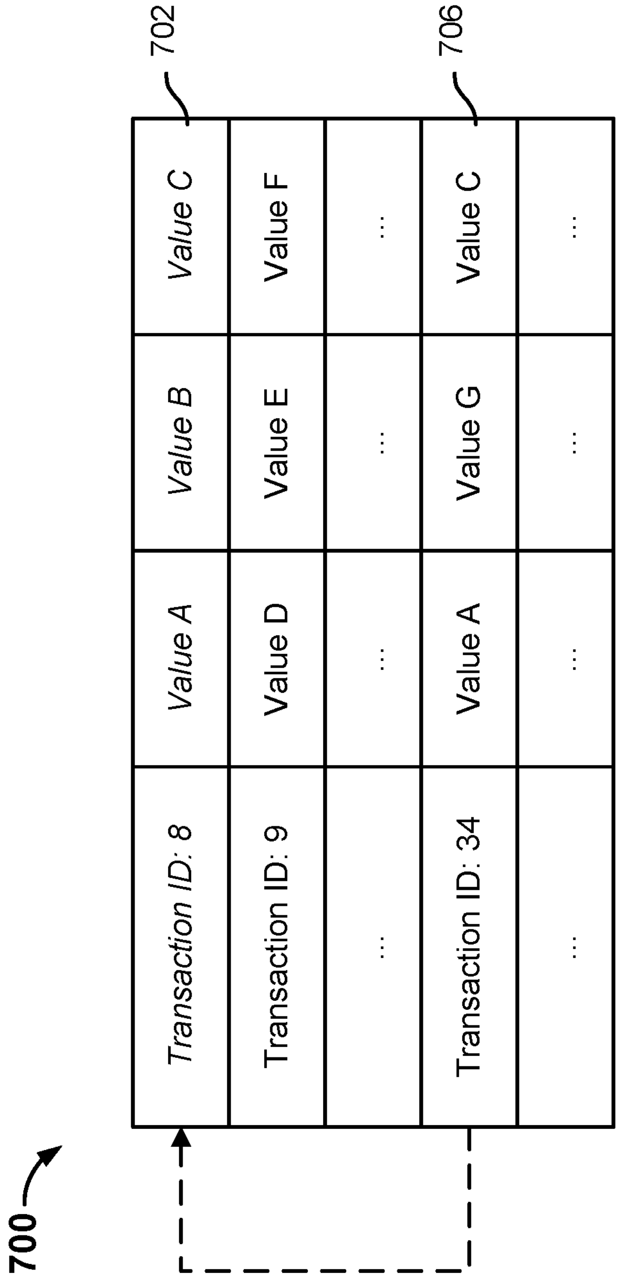
FIG. 7 is a diagram showing example rows in a write storage after a row has been updated.

FIG. 7 is a diagram showing example rows in a write storage after a row has been updated. Table 700, a table in a write storage, shows an example result of an update operation having been made to row 702. The result of updating row 702 was that new row, row 706, that includes the unchanged data of row 702 ("Value A" and "Value C") and the updated data ("Value G") that was included in the update operation was inserted into table 700. Row 706 is assigned "Transaction ID: 34" and also links back to the original row, row 702. As will be described in FIG. 8, below, whenever a row in the write storage is updated/modified for the first time, the age of the row at the time that it was first updated/modified is determined as the "modification age" and is used to update a current modification age distribution.

Figure 8:
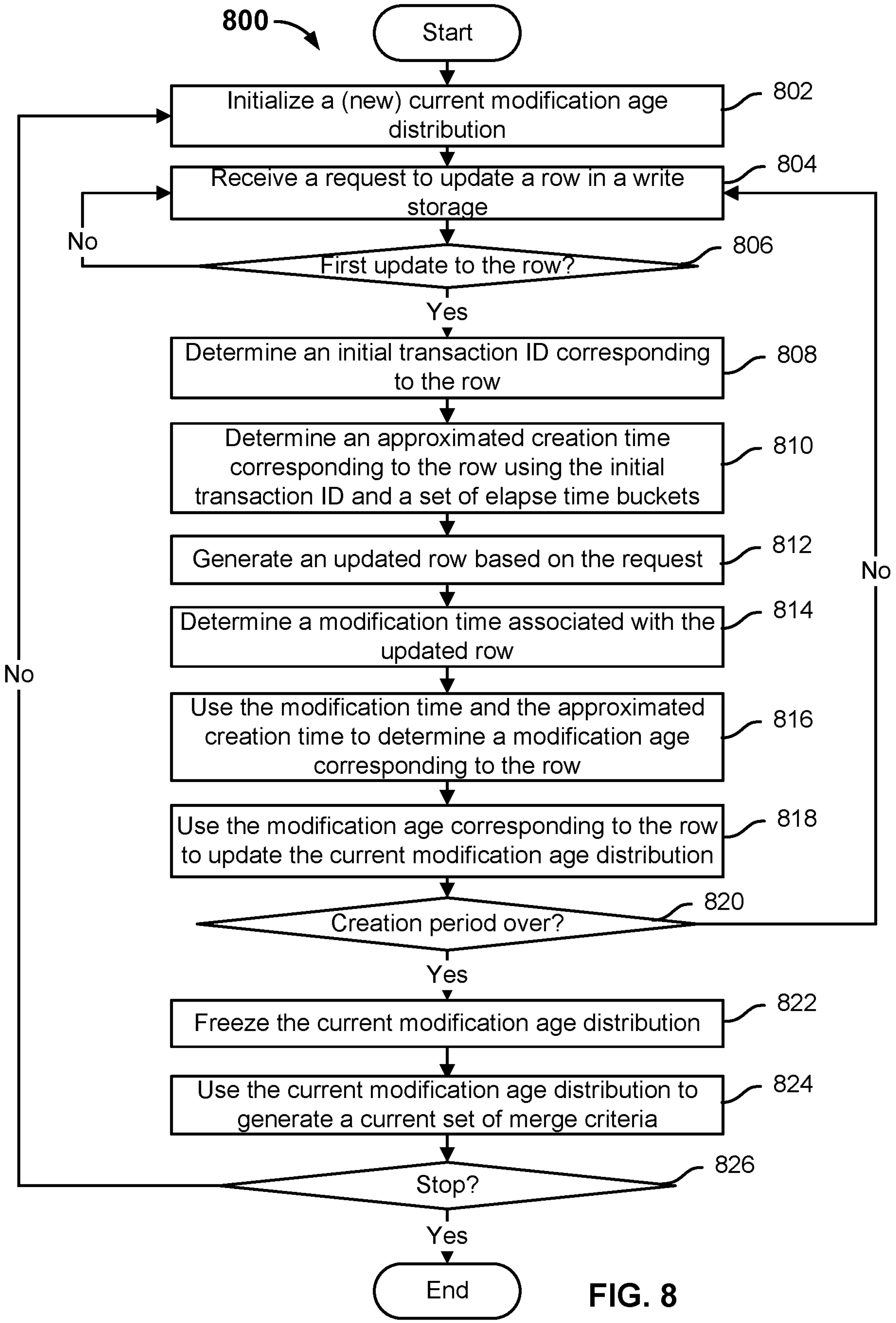
FIG. 8 is a flow diagram showing an example of a process for generating a current modification age distribution.

FIG. 8 is a flow diagram showing an example of a process for generating a current modification age distribution. In some embodiments, process 800 is implemented at database system 100 of FIG. 1.

Process 800 is an example process that describes that a current modification age distribution is determined periodically, per a configurable modification age distribution creation period, based on the first updates to rows in the write storage during the current modification age distribution creation period. After a modification age distribution creation period is over, the current modification age distribution that was created during that period is frozen and used to generate a current set of merge criteria, which is then used to perform intelligent merging of rows from the write storage to the read storage. As such, process 800 shows how a current set of merge criteria is generated based on recent transactions/updates that are made to the write storage so that merging can always be performed in a way that best reflects the current update behavior/patterns at the write storage.

At 802, a (new) current modification age distribution is initialized. In some embodiments, a new current modification age distribution can be initialized by initializing a new data structure (e.g., an array) that is to be used to store data for the new distribution.

At 804, a request to update a row in a write storage is received. For example, the request to update comprises an INSERT SQL statement that identifies an existing row in the write storage.

At 806, whether the request is a first update to the row is determined. In the event that the request is the first update to the row, control is transferred to 808. Otherwise, in the event that the request is not the first update to the row, control is returned to 804. After the row relevant to the request is located in the write storage, whether the row has been updated at least once before can be determined, in some embodiments, based on whether the row is linked to any previous, overwritten/outdated rows in the write storage. As shown in the example of FIG. 7, in some embodiments, once a row has been updated in the write storage, the updated version of the row is linked to a previous version of the row. Therefore, if the located row is not linked to any previous versions of the row, then the located row is being updated for the first time and its modification age will be used to update the current modification age distribution. Otherwise, if the located row is linked to at least one previous version of the row, then the located row is not being updated for the first time.

At 808, an initial transaction ID corresponding to the row is determined. The transaction ID that is included/associated with the located row in the write storage is the initial transaction ID of the transaction associated with adding/inserting/creating the row in the write storage.

Figure 9:
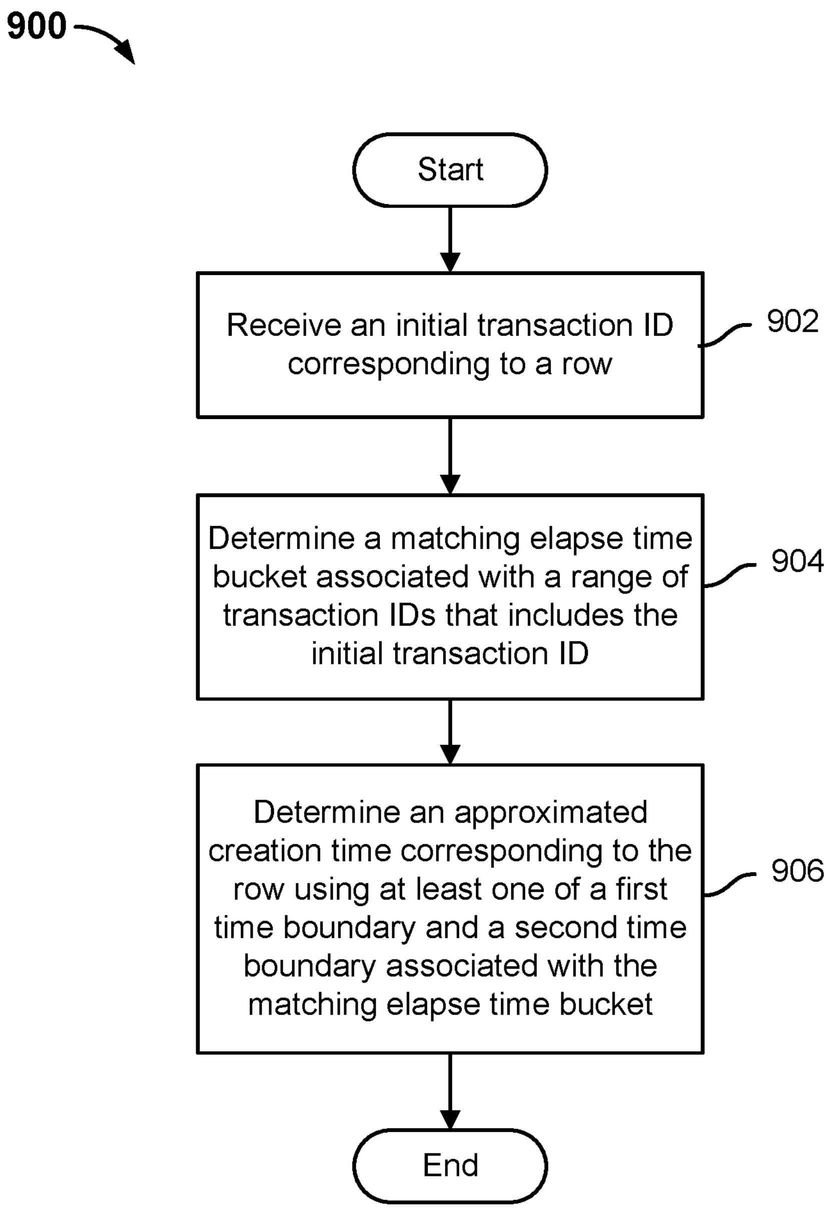
FIG. 9 is a flow diagram showing an example of a process for determining an approximated creation time corresponding to a row.

At 810, an approximated creation time corresponding to the row is determined using the initial transaction ID and a set of elapse time buckets. A set of elapse time buckets is consulted by comparing the initial transaction ID to the ranges of transaction IDs corresponding to each elapse time bucket to determine an approximated creation time corresponding to the row. As mentioned above, it is expensive to track the exact time at which each row is created in the write storage and so the set of elapse time buckets, as described above, is maintained as a more computationally efficient technique for approximating the creation time of a row in the write storage. FIG. 9, below, describes an example process for determining the approximated creation time corresponding to the row using the row's initial transaction ID.

Returning to FIG. 8, at 812, an updated row is generated based on the request. In some embodiments, a new version of the row is created in the write storage. The new version of the row is linked back to the previous version of the row. The new version of the row is associated with a new transaction ID of the update transaction. However, as mentioned above, it is the transaction ID of the original row that is used as the initial transaction ID for determining the row's approximated creation time.

At 814, a modification time associated with the updated row is determined. For example, the modification time associated with the updated version of the row is the time at which the updated version of the row was created or when the update operation was committed at the database. In some embodiments, the modification time is defined as a length of time (e.g., in second, minutes, and/or hours) relative to the same event (e.g., when the database system started running) against which the elapse time buckets in the set of elapse buckets are maintained.

At 816, the modification time and the approximated creation time are used to determine a modification age corresponding to the row. In some embodiments, the difference between the modification time and the approximated creation time is the modification age corresponding to the row.

At 818, the modification age corresponding to the row is used to update the current modification age distribution. In some embodiments, the current modification age distribution is a histogram with corresponding counters to various modification age ranges/groups. The counter corresponding to the matching modification age range/group that includes the modification age of the row is updated (e.g., incremented by one).

At 820, whether a current modification age distribution creation period is over is determined. In the event that the modification age distribution creation period is over, control is transferred to 822. Otherwise, in the event that the modification age distribution creation period is not over, control is returned to 804. As mentioned above, the modification age distribution creation period may be configured by a user. For example, where the update behavior at a table in the write storage is expected to change rapidly, the modification age distribution creation period can be set to be a shorter period. And where the update behavior at a table in the write storage is expected to change slowly, the modification age distribution creation period can be set to be a longer period. In some embodiments, the modification age distribution creation period can be configured as a function of the configured elapse time bucket size. For example, the modification distribution creation period can be configured to be 30 minutes or one hour. In another example, the modification distribution creation period can be configured to be the length of 25 elapse time buckets.

Figure 10:
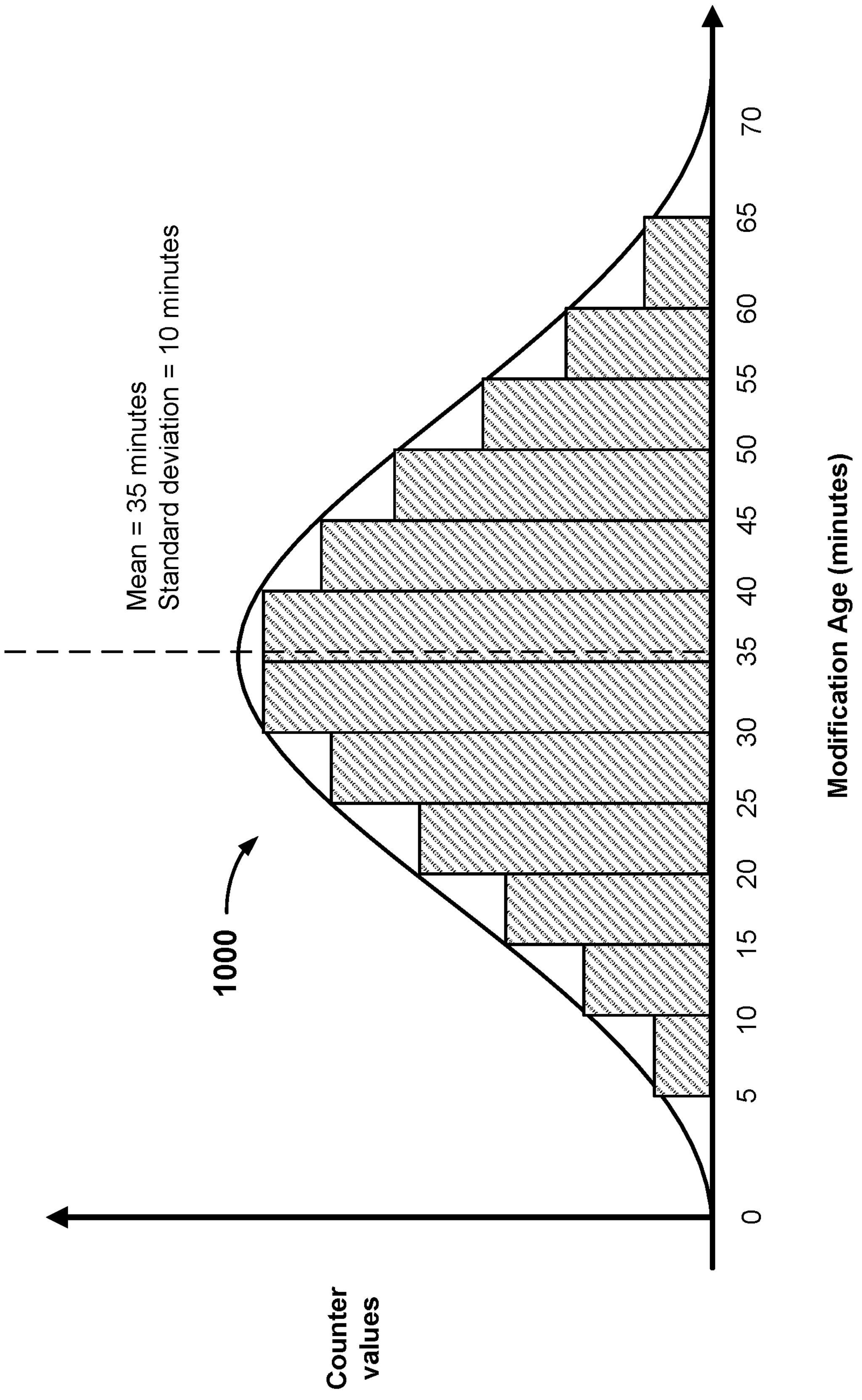
FIG. 10 is a diagram showing an example modification age distribution.

At 822, the current modification age distribution is frozen. After the current modification age distribution creation period is over, the current modification age distribution that was created during that period is no longer updated. FIG. 10 shows an example modification age distribution.

Figure 13:
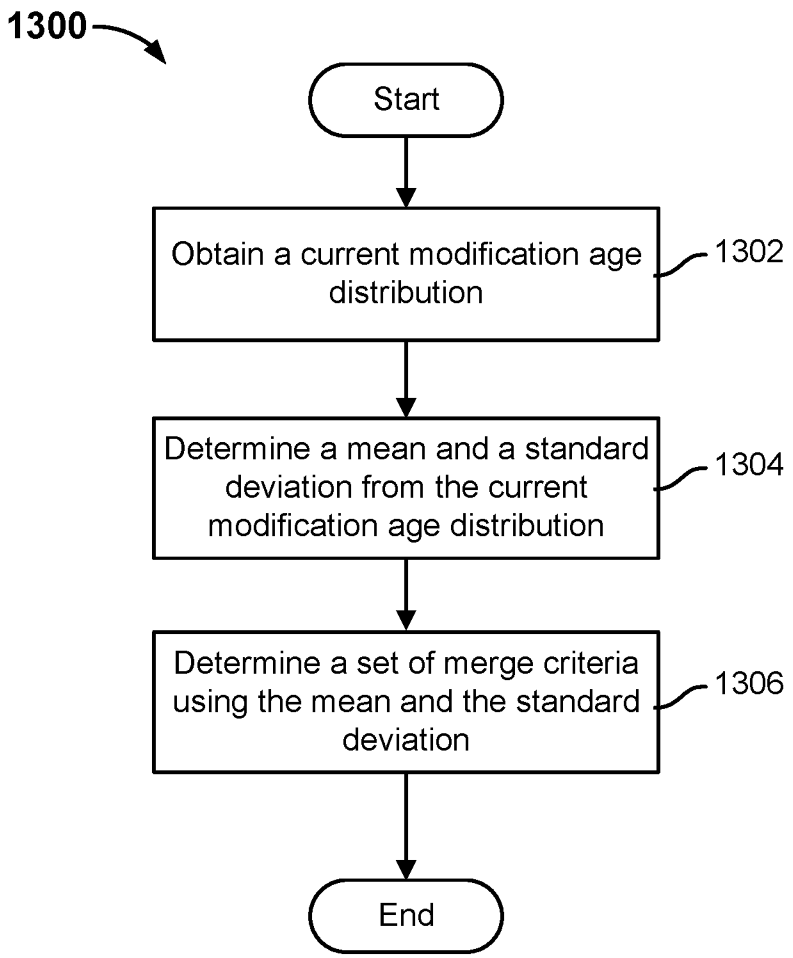
FIG. 13 is a flow diagram showing an example of a process for determining a set of merge criteria.

Returning to FIG. 8, at 824, the current modification age distribution is used to generate a current set of merge criteria. In some embodiments, one or more statistical properties are determined based on the frozen current modification age distribution. For example, the statistical properties may include the mean modification age and the standard deviation of the modification ages. In some embodiments, a current set of merge criteria is determined using the determined statistical properties. In some embodiments, the current set of merge criteria includes at least a threshold merge age. FIG. 13 shows an example process for determining a set of merge criteria from a modification age distribution.

Returning to FIG. 8, at 826, whether process 800 is to be stopped is determined. In the event that the process is to be stopped, the process ends. Otherwise, in the event that the process is not to be stopped, control is returned to 802. For example, process 800 may be stopped if the system loses power.

FIG. 9 is a flow diagram showing an example of a process for determining an approximated creation time corresponding to a row. In some embodiments, process 900 is implemented at database system 100 of FIG. 1. In some embodiments, step 810 of process 800 of FIG. 8 is implemented, at least in part, using process 900.

Process 900 may be used to determine the approximated creation time corresponding to a row. For example, the approximated creation time corresponding to a row may be used to determine a modification age of the row (e.g., when the row is updated for the first time) or the current age of the row (e.g., at any point in time, such as during a merge process).

At 902, an initial transaction ID corresponding to a row is received. The initial transaction ID is included in the earliest/oldest version of a row in the write storage.

At 904, a matching elapse time bucket associated with a range of transaction IDs that includes the initial transaction ID is determined. A set of elapse buckets (e.g., such as the example shown in FIG. 5) that have been determined for the table, with which the row is a part of, is used to determine a "matching" elapse time bucket whose range of transaction IDs (that is bounded by the bucket's minimum transaction ID and maximum transaction ID) includes the initial transaction ID.

At 906, an approximated creation time corresponding to the row is determined using at least one of a lower time boundary and an upper time boundary associated with the matching elapse time bucket. The approximated creation time corresponding to the row is determined as a configurable function as one or both of the lower time boundary and the upper time boundary of the matching elapse time bucket. In a first example, the function may select either the lower time boundary or the upper time boundary of the matching elapse time bucket to serve as the approximated creation time corresponding to the row. In a second example, the function may determine the average between the lower time boundary and the upper time boundary of the matching elapse time bucket to serve as the approximated creation time corresponding to the row.

The following is an example that applies process 800 of FIG. 8 and process 900 of FIG. 9 to determining a modification age corresponding to a row that is updated: Referring back to the example write storage table 700 shown in FIG. 7, when row 702 was updated, its modification age is to be determined. The initial transaction ID corresponding to row 702 is "8." Referring to the example set of elapse time buckets shown in FIG. 5, initial transaction ID "8" falls into the transaction ID range (as defined by the minimum transaction ID and the maximum transaction ID) of 1-14 corresponding to the elapse time bucket that is defined by "0 to 10 minutes." Assume that, in this example, the elapse time buckets of FIG. 5 are defined relative to when the database system started running. Assume that, in this example, the upper time boundary of the matching time elapse bucket is used to serve as the approximated creation time corresponding to the row. As such, 10 minutes, the upper time boundary of the "0 to 10 minutes" elapse time bucket, is determined as the approximated creation time corresponding to the row. Assume that the modification time of row 702 (resulting in new row 706 being committed) is 25 minutes relative to when the database system started running. As a result, the modification age corresponding to row 702 is its modification time (25 minutes) minus its approximated creation time (10 minutes), which is 15 minutes. The modification age of 15 minutes would then be used to update a current modification age distribution.

FIG. 10 is a diagram showing an example modification age distribution. In the example of FIG. 10, the modification age distribution includes modification age ranges/groups, where the size of each age range/group is five minutes and the age ranges/groups span 0 to 70 minutes (e.g., from when the database system started running). As rows are updated in the write storage, their modification ages are determined and used to increase the counter values for their corresponding modification age ranges/groups of modification age distribution 1000 (e.g., using a process such as process 800 of FIG. 8). For example, data for modification age distribution 1000 may be tracked using an array, where each element of the array was initialized to zero when modification age distribution 1000 was initialized (e.g., at the start of a corresponding modification age distribution creation period). As rows are updated in the write storage, their corresponding modification ages are determined and used to update corresponding counts in the array. As such, modification age distribution 1000 represents the distribution of the counter values for each modification age range/group. Some statistical properties of modification age distribution 1000 include a mean of 35 minutes and a standard deviation of 10 minutes. The statistical properties of modification age distribution 1000 may be used to determine a set of merge criteria, in some embodiments.

In many cases, a modification age distribution is expected to be a normal distribution.

Figure 11:
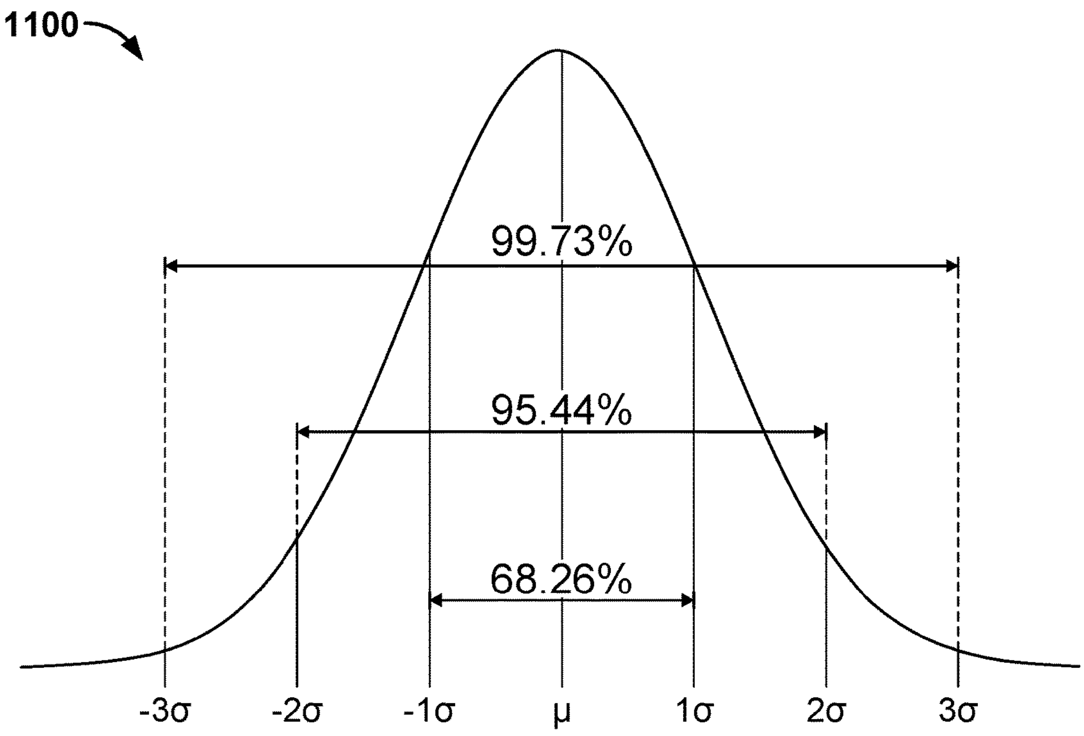
FIG. 11 is a diagram showing an example normal distribution.

FIG. 11 is a diagram showing an example normal distribution. As shown in FIG. 11, one standard deviation, a, away from the mean of normal distribution 1100, μ, in both directions includes 68.26% of the data samples. Two standard deviations, 2σ, away from the mean of normal distribution 1200, μ, in both directions includes 95.44% of the data samples. Three standard deviations, 3σ, away from the mean of normal distribution 1200, μ, in both directions includes 99.73% of the data samples. Assuming that modification age distribution 1100 of FIG. 11 were a normal distribution, then its mean of 35 minutes represents that most rows in that example were modified/updated for the first time when their age in the write storage was 35 minutes. Furthermore, 68.26% of all rows of the write storage were updated within one standard deviation (10 minutes) away from the mean of modification age distribution 1100 (i.e., at modification ages of 25 minutes through 45 minutes), 95.44% of all rows of the write storage were updated within two standard deviations (20 minutes) away from the mean of modification age distribution 1100 (i.e., at modification ages of 15 minutes through 55 minutes), and 99.73% of all rows of the write storage were updated within three standard deviation (30 minutes) away from the mean of modification age distribution 1100 (i.e., at modification ages of 5 minutes through 65 minutes).

In some embodiments, if a generated modification age distribution is not a normal distribution (e.g., if the mean and standard deviation of the modification age distribution do not conform, within a given margin, to the properties of a normal distribution such as the one described in FIG. 11), one of two common scenarios may have occurred. The first one is there are only few updates for the table in the write storage. In this case, a default merge policy may be used to perform merging. For example, a default merge policy can be merging relatively older rows based on a static row age. The second case is that the updates on many rows are random in terms of time. In this case, the default merge policy can be used as well.

In some embodiments, statistical properties of a generated modification age distribution are used to determine a set of merge criteria, including at least a threshold merge age, based on a configured confidence level. In statistics, a "confidence interval" (CI) is an interval estimate computed from the statistical properties of a set of data. The estimated interval is expected to contain the true value of an unknown population parameter, e.g., the mean of a population. It is associated with a confidence level that quantifies the level of confidence that the parameter lies in the interval.

Assume that the confidence level specified by a user is 95%. It means that if the same population is sampled numerous times and that interval estimates are made from them, the resulting intervals would bracket the true population parameter in approximately 95% of the cases.

In statistics, hypothesis testing can be one or two-sided, confidence intervals can also be one or two-sided. A two-sided confidence interval brackets the population parameter from above and below. A one-sided confidence interval brackets the population parameter either from above or below and furnishes an upper or lower bound to its magnitude.

Figure 12:
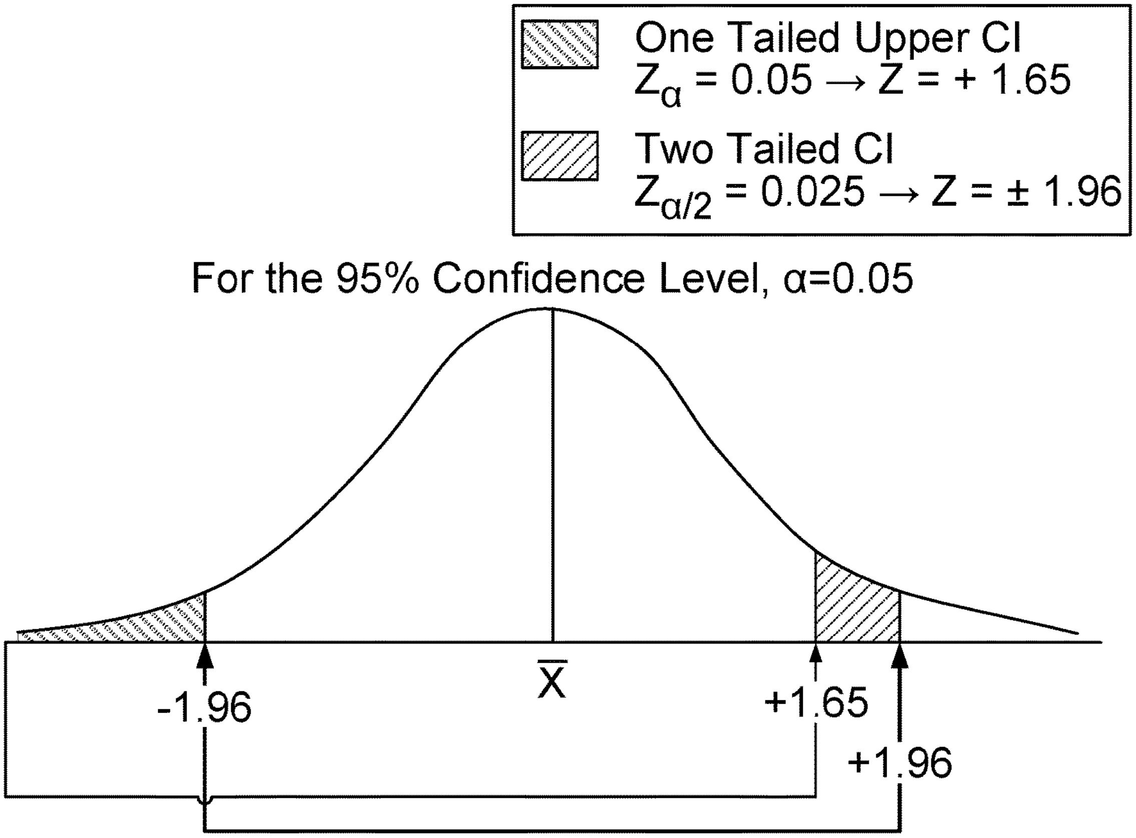
FIG. 12 is a diagram that shows that for a one-tail upper CI in a normal distribution.

For example, FIG. 12 is a diagram that shows that for a one-tail upper CI in a normal distribution, when the confidence level is set to 95%, the cut-off would be at the point of $\bar{x}+1.65\sigma$, where $\bar{x}$ is the mean and a is the standard deviation. When the mean and the standard deviation of a modification age distribution are input into the $\bar{x}+1.65\sigma$ equation (assuming that the modification age distribution is a normal distribution), the resulting age is the cut-off age after which it is expected that 95% of the rows in a write storage will no longer be updated. In some embodiments, if the modification age distribution is a normal distribution, for a given confidence level of 95%, the equation $\bar{x}+1.65\sigma$, where $\bar{x}$ is the mean and a is the standard deviation, is used to determine a threshold merge age. Of course, a confidence level of 95% is merely an example and in practice, any confidence level may be configured and a corresponding equation that relates a modification age distribution's mean and standard deviation may be used to determine a cut-off or threshold merge age. Also, if the modification age distribution is a distribution that is other than a normal distribution, the 95% cut-off or threshold merge age may be computed using an equation other than $\bar{x}+1.65\sigma$.

FIG. 13 is a flow diagram showing an example of a process for determining a set of merge criteria. In some embodiments, process 1300 is implemented at database system 100 of FIG. 1. In some embodiments, step 824 of process 800 of FIG. 8 is implemented, at least in part, using process 1300.

At 1302, a current modification age distribution is obtained. In some embodiments, the current modification age distribution is generated using a process such as process 800 of FIG. 8.

At 1304, a mean and a standard deviation are determined from the current modification age distribution.

At 1306, a set of merge criteria is determined using the mean and the standard deviation. In some embodiments, the set of merge criteria includes a threshold merge age and a configurable grace period. In some embodiments, the threshold merge age is determined based on a configurable confidence level for a one-tail upper confidence interval. As described above in FIG. 12, for a 95% confidence level for a one-tail upper confidence interval, the cut-off age (the threshold merge age) is determined as $\bar{x}+1.65\sigma$, where $\bar{x}$ is the mean and a is the standard deviation. Referring back to the example of modification age distribution 1000 of FIG. 10, the threshold merge age for modification age distribution 1000 can be determined as $\bar{x}+1.65\sigma$ (35+1.65*10)=51.5 minutes. As such, for modification age distribution 1000 of FIG. 10, it is expected that 95% of rows in the write storage are modified for the first time by the age of 51.5 minutes (i.e., it is expected that 95% of rows in the write storage are modified for the first time by the time that they have been in the write storage for 51.5 minutes). In some embodiments, the grace period can be a fixed length of time that is configured by a user or that is determined as a function (e.g., a user configured percentage) of the determined threshold merge age. For example, the grace period may be configured to be 10% of the threshold merge age. As will be described in further detail below, during a merge process, in some embodiments, a row in the write storage meets the set of merge criteria if the row's current age is greater than the sum of the threshold merge age and the grace period.

Figure 14:
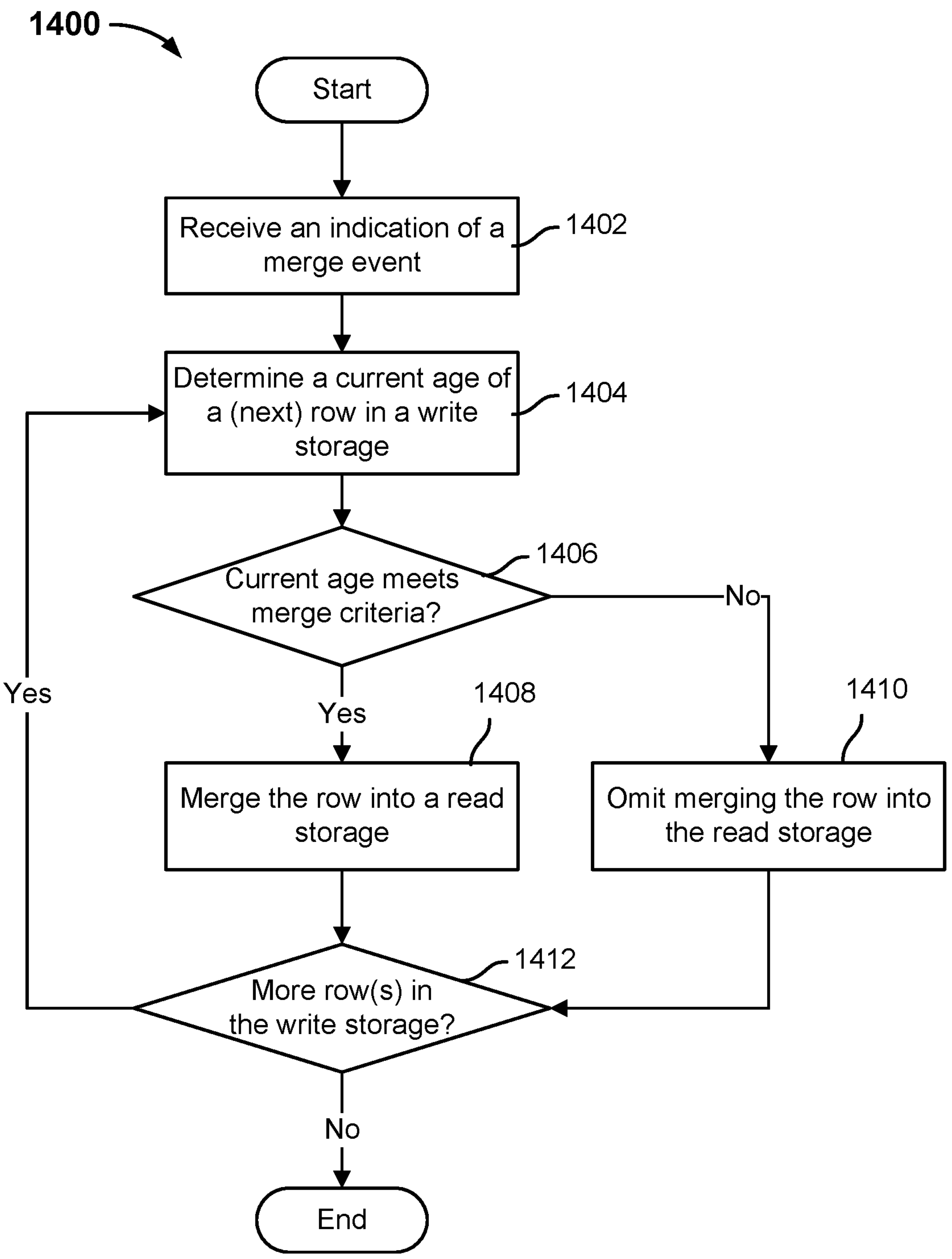
FIG. 14 is a flow diagram showing an example of a process for performing a merge process.

FIG. 14 is a flow diagram showing an example of a process for performing a merge process. In some embodiments, process 1400 is implemented at database system 100 of FIG. 1. In some embodiments, process 200 of FIG. 2 is implemented, at least in part, using process 1400.

Process 1400 is an example process that describes performing a merge process by determining whether a row should be copied from a table in a write storage to the table in a read storage based on the current age of each row.

At 1402, an indication of a merge event is received. A merge event initiates a merge process. In some embodiments, a merge event occurs at every configured period. In some embodiments, a merge event occurs in response to a user request or a request from an application.

Figure 15:
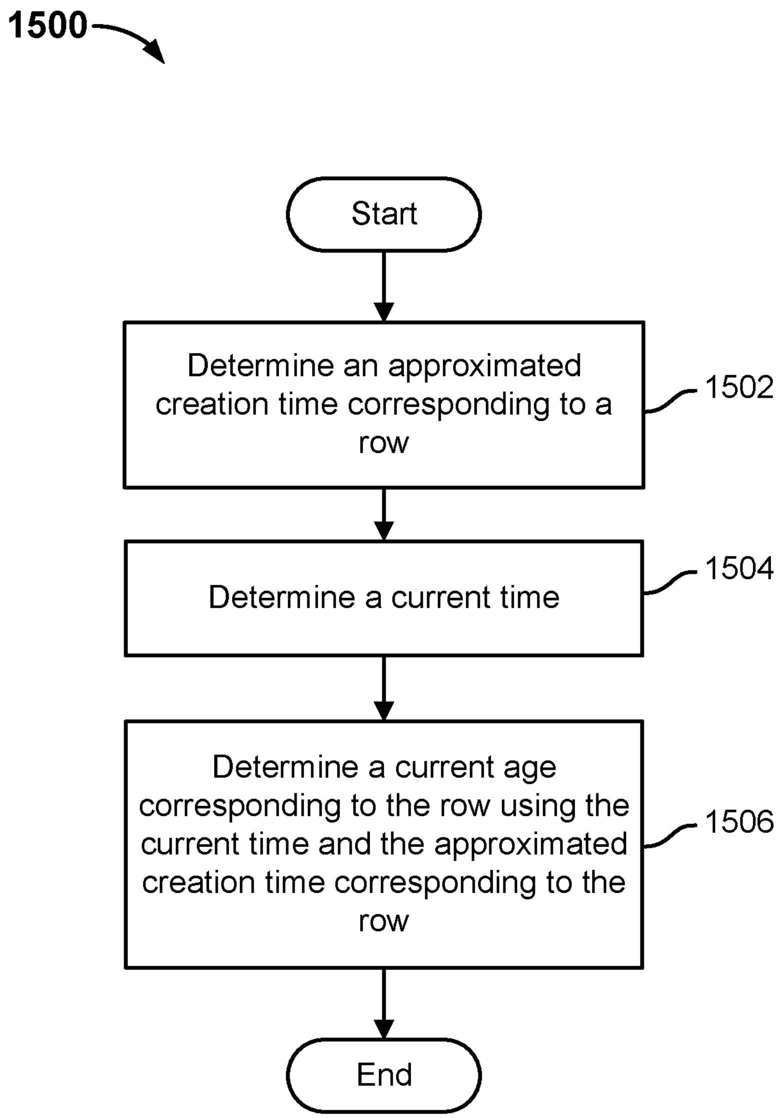
FIG. 15 is a flow diagram showing an example of a process for determining a current age of a row in a write storage.

At 1404, a current age of a (next) row in a write storage is determined. As mentioned above, the "current age" of a row is the length of time that the row has been in the write storage portion of the database since it was added to the database. In some embodiments, the current age is determined by determining an approximated creation time of the row (e.g., using a set of elapse time buckets) and the current time (e.g., the time at which the merge process is being performed). FIG. 15 describes an example process of determining a current age of a row.

Returning to FIG. 14, at 1406, whether the current age meets a set of merge criteria is determined. In the event that the current age meets the set of merge criteria, control is transferred to 1408. Otherwise, in the event that the current age does not meet the set of merge criteria, control is transferred to 1410. In some embodiments, the set of merge criteria comprises at least a threshold merge age and optionally, a grace period. In some embodiments, the current age meets the set of merge criteria if the current age is greater than the sum of the threshold merge age and the grace period.

At 1408, the row is merged into a read storage.

At 1410, the row is omitted from being merged into the read storage. If the current age does not meet the set of merge criteria, the row remains in the write storage and, if it is not deleted before the next merge event, it is evaluated again at the next merge process for whether it should be merged at that time.

At 1412, whether there are more rows in the write storage is determined. In the event that there is at least one more row in the write storage, control is returned to 1404. Otherwise, in the event that there are no more rows in the write storage, the process ends.

FIG. 15 is a flow diagram showing an example of a process for determining a current age of a row in a write storage. In some embodiments, process 1500 is implemented at database system 100 of FIG. 1. In some embodiments, step 1404 of process 1400 of FIG. 14 is implemented, at least in part, using process 1500.

Process 1500 may be used to determine a current age of a row in a write storage while the row is being considered for merging into a read storage during a merge process.

At 1502, an approximated creation time corresponding to a row is determined.

The approximated creation time corresponding to the row can be determined using a process such as process 900 of FIG. 9.

At 1504, a current time is determined. In some embodiments, the current time is associated with the merge process. For example, the current time could be when the merge process began. In some embodiments, the current time is defined relative to the same event (e.g., when the database system started running) against which the elapse time buckets in the set of elapse buckets are maintained At 1506, a current age corresponding to the row is determined using the current time and the approximated creation time corresponding to the row. In some embodiments, the current age corresponding to the row is determined as the difference between the current time and the approximated creation time.

Figure 16:
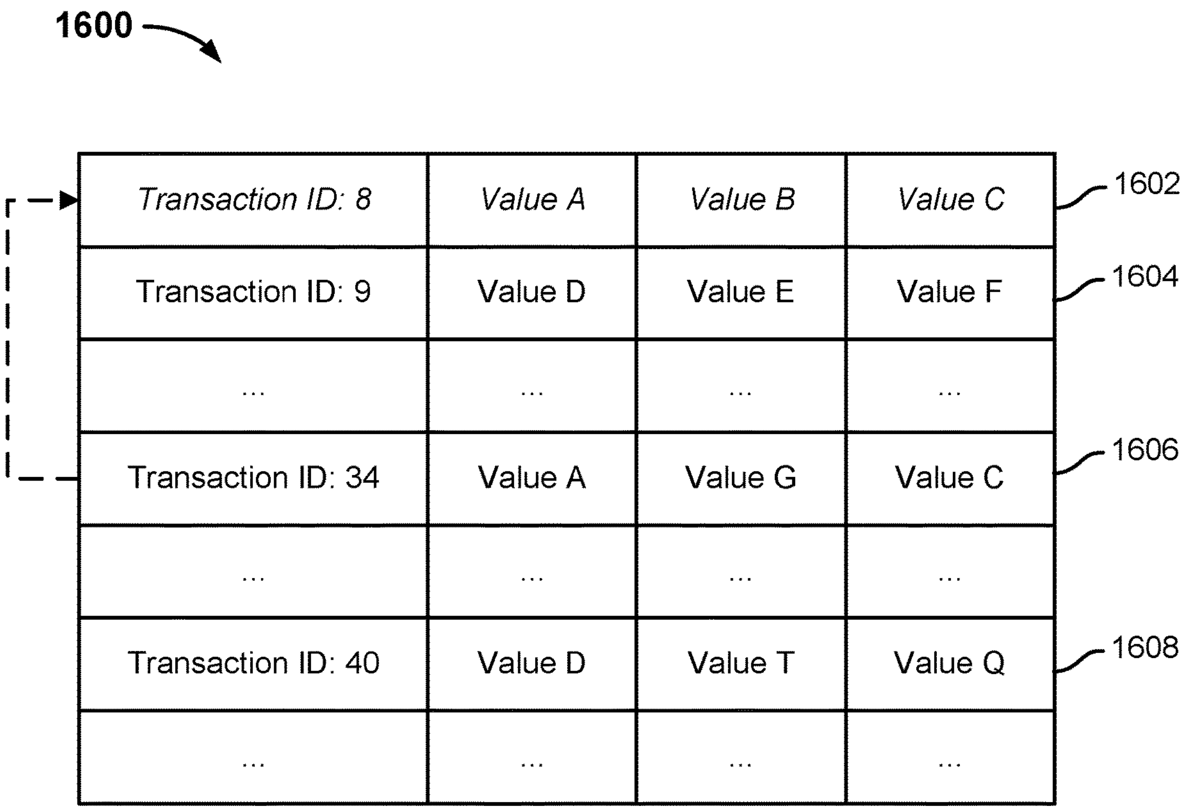
FIG. 16 is a diagram showing an example of performing merging of rows in a write storage in accordance with some embodiments.

FIG. 16 is a diagram showing an example of performing merging of rows in a write storage in accordance with some embodiments. In this example, assume that the current time is 80 minutes (since the database system started running), and assume that the set of merge criteria is the condition of being greater than the sum of a threshold merge age of 51.5 minutes and a grace period of 5 minutes. Assume that a merge process is being performed and the rows of table 1600 are considered for whether they should be merged into a read storage.

Row 1602 is not eligible for merging because it is a previous/outdated version of another row, row 1606 in table 1600.

Row 1604 is eligible for merging and so its current age is determined. In this example, the approximated creation time of row 1604 is determined by comparing its transaction ID of "9" to the example set of elapse time buckets of FIG. 5. The "0 to 10 minutes" elapse time bucket with the corresponding transaction ID range of 1 through 14 is the matching elapse time bucket. In this example, assume that the upper time boundary of the matching elapse time bucket is determined as the approximated creation time of the row. As such, the approximated creation time of row 1604 is 10 minutes. Given that the current time is 80 minutes, the current age of row 1604 is the difference between the current time (80 minutes) and the approximated creation time (10 minutes), which is 70 minutes. Since the current age of 70 minutes is greater than the sum of the threshold merge age of 51.5 minutes and a grace period of 5 minutes, 56.5 minutes, row 1604 meets the set of merge criteria and will therefore be merged into the read storage.

Row 1606 is eligible for merging and so its current age is determined. Row 1606 is an updated version of original row 1602, whose transaction ID of 8 is used to determine the approximated creation time of row 1606. Referring to the example set of elapse time buckets of FIG. 5, the approximated creation time of row 1606 is 10 minutes. Given that the current time is 80 minutes, the current age of row 1606 is the difference between the current time (80 minutes) and the approximated creation time (10 minutes), which is 70 minutes. Since the current age of 70 minutes is greater than the sum of the threshold merge age of 51.5 minutes and a grace period of 5 minutes, 56.5 minutes, row 1606 meets the set of merge criteria and will therefore be merged into the read storage.

Row 1608 is eligible for merging and so its current age is determined. The approximated creation time of row 1608 is determined by comparing its transaction ID of "40" to the example set of elapse time buckets of FIG. 5. The approximated creation time of row 1608 is therefore 30 minutes. Given that the current time is 80 minutes, the current age of row 1608 is the difference between the current time (80 minutes) and the approximated creation time (30 minutes), which is 50 minutes. Since the current age of 50 minutes is not greater than the sum of the threshold merge age of 51.5 minutes and a grace period of 5 minutes, 56.5 minutes, row 1608 does not meet the set of merge criteria and therefore will not be merged into the read storage.

Figure 17:
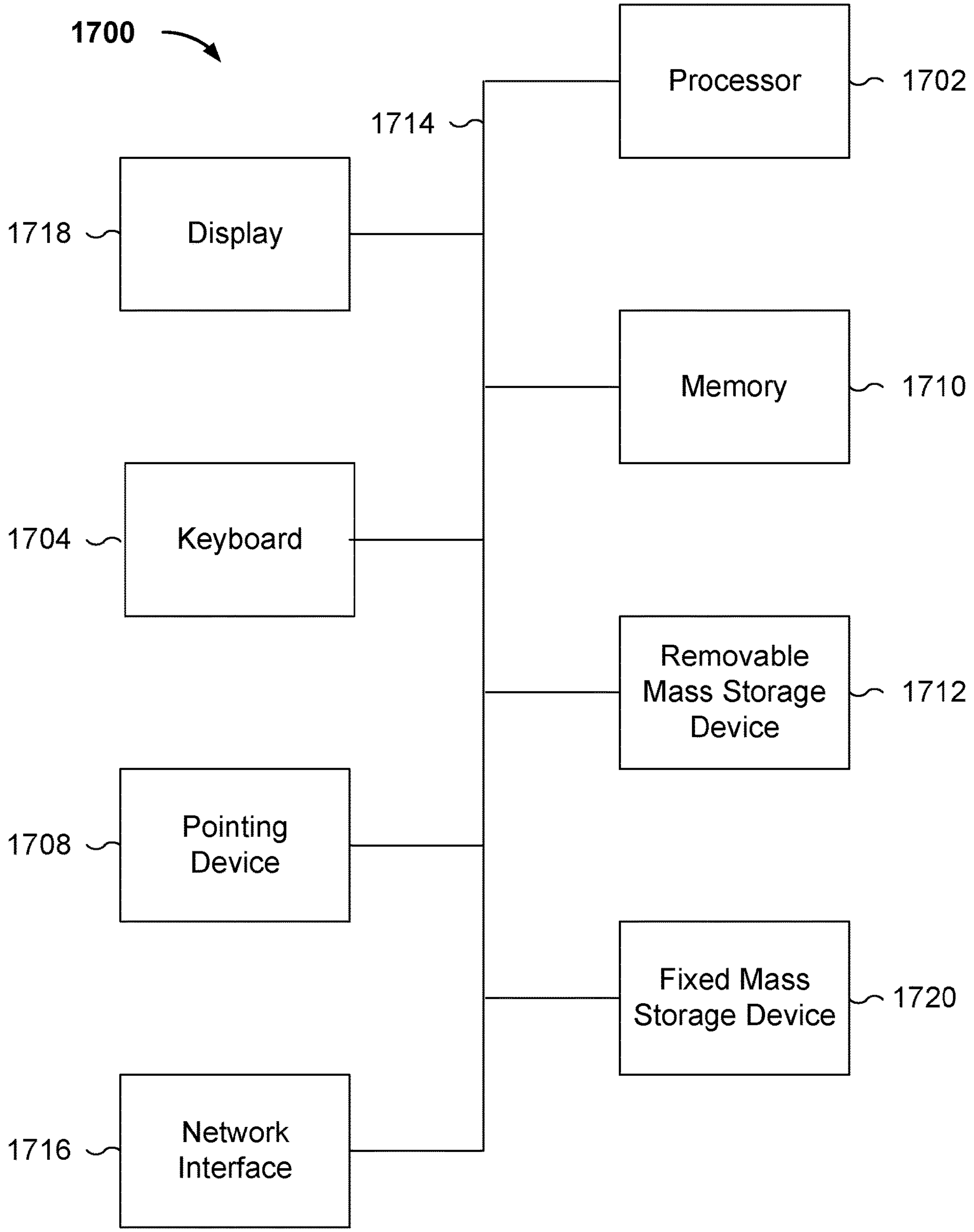
FIG. 17 is a functional diagram illustrating an embodiment of a database system for performing intelligent merging for efficient updates in a columnar database.

FIG. 17 is a functional diagram illustrating an embodiment of a database system for performing intelligent merging for efficient updates in a columnar database. As will be apparent, other computer system architectures and configurations can be used to perform intelligent merging for efficient updates in a columnar database. In some embodiments, database system 100 of FIG. 1 may be implemented using computer system 1700. Computer system 1700, which includes various subsystems as described below, includes at least one microprocessor subsystem (also referred to as a processor or a central processing unit (CPU)) 1702. For example, processor 1702 can be implemented by a single-chip processor or by multiple processors. In some embodiments, processor 1702 is a general purpose digital processor that controls the operation of the computer system 1700. Using instructions retrieved from memory 1710, the processor 1702 controls the reception and manipulation of input data, and the output and display of data on output devices (e.g., display 1718).

Processor 1702 is coupled bi-directionally with memory 1710, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1702. Also as is well known in the art, primary storage typically includes basic operating instructions, program code, data, and objects used by the processor 1702 to perform its functions (e.g., programmed instructions). For example, memory 1710 can include any suitable computer readable storage media, described below, depending on whether, for example, data access needs to be bi-directional or uni-directional. For example, processor 1702 can also directly and very rapidly retrieve and store frequently needed data in a cache memory (not shown).

A removable mass storage device 1712 provides additional data storage capacity for the computer system 1700 and is coupled either bi-directionally (read/write) or uni-directionally (read only) to processor 1702. For example, storage 1712 can also include computer readable media such as magnetic tape, flash memory, PC-CARDS, portable mass storage devices, holographic storage devices, and other storage devices. A fixed mass storage 1720 can also, for example, provide additional data storage capacity. The most common example of fixed mass storage 1720 is a hard disk drive. Mass storages 1712, 1720 generally store additional programming instructions, data, and the like that typically are not in active use by the processor 1702. It will be appreciated that the information retained within mass storages 1712 and 1720 can be incorporated, if needed, in standard fashion as part of memory 1710 (e.g., RAM) as virtual memory.

In addition to providing processor 1702 access to storage subsystems, bus 1714 can also be used to provide access to other subsystems and devices. As shown, these can include a display 1718, a network interface 1716, a keyboard 1704, and a pointing device 1708, as well as an auxiliary input/output device interface, a sound card, speakers, and other subsystems as needed. For example, the pointing device 1708 can be a mouse, stylus, track ball, or tablet, and is useful for interacting with a graphical user interface.

The network interface 1716 allows processor 1702 to be coupled to another computer, computer network, or telecommunications network using a network connection as shown. For example, through the network interface 1716, the processor 1702 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1702 can be used to connect the computer system 1700 to an external network and transfer data according to standard protocols. For example, various process embodiments disclosed herein can be executed on processor 1702, or can be performed across a network such as the Internet, intranet networks, or local area networks, in conjunction with a remote processor that shares a portion of the processing. Additional mass storage devices (not shown) can also be connected to processor 1702 through network interface 1716.

An auxiliary I/O device interface (not shown) can be used in conjunction with computer system 1700. The auxiliary I/O device interface can include general and customized interfaces that allow the processor 1702 to send and, more typically, receive data from other devices such as microphones, touch-sensitive displays, transducer card readers, tape readers, voice or handwriting recognizers, biometrics readers, cameras, portable mass storage devices, and other computers.

For example, computer system 1700 may comprise a smart phone or a tablet computer. For example, memory 1710 is configured to store program instructions, and processor 1702, coupled to memory 1710, is configured to read the program instructions stored by memory 1710 and, in response, execute steps described in process 200 of FIG. 2, process 400 of FIG. 4, process 800 of FIG. 8, process 900 of FIG. 9, process 1300 of FIG. 13, process 1400 of FIG. 14, and process 1500 of FIG. 15.

Various embodiments described herein enable a determination of whether each row should be merged from a write to a read storage in a database system based on a dynamically updated model that reflects the current update behavior/patterns at the write storage. As a result, rows are merged into the read storage only after it is expected that they will not be updated/modified (again). Put another way, various embodiments herein reduce the number of costly update operations that would have been needed to be performed to rows in a read storage, by waiting to merge rows only after a period during which they are expected to be updated.

Although the foregoing embodiments have been described in some detail for purposes of clarity of understanding, the disclosure is not limited to the details provided. There are many alternative ways of implementing the disclosure. The disclosed embodiments are illustrative and not restrictive.

What is claimed is:

1. A database system, comprising:

one or more processors configured to:

determine a current age associated with a row in a database, wherein the database comprises a write storage and a read storage, wherein the row is located in the write storage;

determine a set of one or more merge criteria based at least in part on a modification age distribution, wherein the modification age distribution is dynamically determined based at least in part on previous transactions at the database;

determine whether the current age meets the set of merge criteria; and in response to a determination that the current age meets the set of merge criteria, merge the row from the write storage into the read storage; and one or more memories coupled to the one or more processors and configured to provide instructions to the one or more processors.

2. The database system of claim 1, wherein the one or more processors are further configured to store, for each of a set of elapse time buckets, a minimum transaction identifier (ID) corresponding to an initial transaction performed at the write storage and a maximum transaction ID corresponding to a last transaction performed at the write storage during that elapse time bucket, wherein each of the set of elapse time buckets is defined by a corresponding lower time boundary and a corresponding upper time boundary.

3. The database system of claim 1, wherein the one or more processors are further configured to determine the modification age distribution, including to:

receive a request to update a row in the write storage;

determine that the request is a first update to the row;

determine an approximated creation time corresponding to the row;

update the row based at least in part on the request;

determine a modification time associated with the updated row;

use the modification time and the approximated creation time to determine a modification age corresponding to the row; and use the modification age corresponding to the row to update the modification age distribution.

4. The database system of claim 3, wherein to determine the approximated creation time corresponding to the row comprises to:

determine an initial transaction ID corresponding to the row;

determine a matching elapse time bucket associated with a range of transaction IDs that includes the initial transaction ID; and determine the approximated creation time corresponding to the row using at least one of a lower time boundary and an upper time boundary associated with the matching elapse time bucket.

5. The database system of claim 3, wherein to use the modification age corresponding to the row to update the modification age distribution comprises to:

determine a matching modification age group associated with the modification age distribution that includes the modification age corresponding to the row; and update a counter corresponding to the matching modification age group.

6. The database system of claim 1, wherein to determine the set of merge criteria based at least in part on the modification age distribution comprises to:

receive a configured confidence level;

determine a mean, a standard deviation, or both, associated with the modification age distribution; and determine the set of merge criteria based at least in part on one or more of the following: the configured confidence level, the mean associated with the modification age distribution, and the standard deviation associated with the modification age distribution.

7. The database system of claim 1, wherein the set of merge criteria comprises a threshold merge age, and wherein to determine whether the current age meets the set of merge criteria comprises to determine whether the current age is greater than the threshold merge age.

8. The database system of claim 1, wherein to determine the current age associated with the row comprises to:

determine an approximated creation time corresponding to the row;

determine a current time; and determine the current age corresponding to the row using the current time and the approximated creation time corresponding to the row.

9. The database system of claim 1, wherein the write storage stores data in a row-oriented format and the read storage stores data in a column-oriented format.

10. The database system of claim 1, wherein the current age comprises a first current age, wherein the row comprises a first row, and wherein the one or more processors are further configured to:

determine a second current age associated with a second row in the write storage;

determine whether the second current age meets the set of merge criteria; and in response to a determination that the second current age does not meet the set of merge criteria, omit to merge the second row from the write storage into the read storage.

11. A method, comprising:

determining a current age associated with a row in a database, wherein the database comprises a write storage and a read storage, wherein the row is located in the write storage;

determining a set of one or more merge criteria based at least in part on a modification age distribution, wherein the modification age distribution is dynamically determined based at least in part on previous transactions at the database;

determining whether the current age meets the set of merge criteria; and in response to a determination that the current age meets the set of merge criteria, merging the row from the write storage into the read storage.

12. The method of claim 11, further comprising storing, for each of a set of elapse time buckets, a minimum transaction identifier (ID) corresponding to an initial transaction performed at the write storage and a maximum transaction ID corresponding to a last transaction performed at the write storage during that elapse time bucket, wherein each of the set of elapse time buckets is defined by a corresponding lower time boundary and a corresponding upper time boundary.

13. The method of claim 11, further comprising determining the modification age distribution, including:

receiving a request to update a row in the write storage;

determining that the request is a first update to the row;

determining an approximated creation time corresponding to the row;

updating the row based at least in part on the request;

determining a modification time associated with the updated row;

using the modification time and the approximated creation time to determine a modification age corresponding to the row; and using the modification age corresponding to the row to update the modification age distribution.

14. The method of claim 13, wherein determining the approximated creation time corresponding to the row comprises:

determining an initial transaction ID corresponding to the row;

determining a matching elapse time bucket associated with a range of transaction IDs that includes the initial transaction ID; and determining the approximated creation time corresponding to the row using at least one of a lower time boundary and an upper time boundary associated with the matching elapse time bucket.

15. The method of claim 13, wherein using the modification age corresponding to the row to update the modification age distribution comprises:

determining a matching modification age group associated with the modification age distribution that includes the modification age corresponding to the row; and updating a counter corresponding to the matching modification age group.

16. The method of claim 11, wherein determining the set of merge criteria based at least in part on the modification age distribution comprises:

receiving a configured confidence level;

determining a mean, a standard deviation, or both, associated with the modification age distribution; and determining the set of merge criteria based at least in part on one or more of the following: the configured confidence level, the mean associated with the modification age distribution, and the standard deviation associated with the modification age distribution.

17. The method of claim 11, wherein the set of merge criteria comprises a threshold merge age, and wherein determining whether the current age meets the set of merge criteria comprises determining whether the current age is greater than the threshold merge age.

18. The method of claim 11, wherein determining the current age associated with the row comprises:

determining an approximated creation time corresponding to the row;

determining a current time; and determining the current age corresponding to the row using the current time and the approximated creation time corresponding to the row.

19. The method of claim 11, wherein the current age comprises a first current age, wherein the row comprises a first row, and the method further comprises:

determining a second current age associated with a second row in the write storage;

determining whether the second current age meets the set of merge criteria; and in response to a determination that the second current age does not meet the set of merge criteria, omitting to merge the second row from the write storage into the read storage.

20. A computer program product, the computer program product being embodied in a non-transitory computer-readable storage medium and comprising computer instructions for:

determining a current age associated with a row in a database, wherein the database comprises a write storage and a read storage, wherein the row is located in the write storage;

determining a set of one or more merge criteria based at least in part on a modification age distribution, wherein the modification age distribution is dynamically determined based at least in part on previous transactions at the database;

determining whether the current age meets the set of merge criteria; and in response to a determination that the current age meets the set of merge criteria, merging the row from the write storage into the read storage.

* * * * *

UNITED STATES PATENT AND TRADEMARK OFFICE

CERTIFICATE OF CORRECTION

PATENT NO. : 11,216,412 B2
APPLICATION NO. : 16/742727
DATED : January 4, 2022
INVENTOR(S) : Luo Congnan et al.

It is certified that error appears in the above-identified patent and that said Letters Patent is hereby corrected as shown below:

On the Title Page

Item (73), assignee, address, after “Alibaba Group Holding Limited”, insert --, (KY)--.

Item (56), other publications, cite no. 1, delete “Modem” and insert --Modern--, therefor.

In the Specification

In Column 5, Line(s) 12, delete “student name, student id,” and insert --student_name, student_id,--, therefor.

In Column 13, Line(s) 62, delete “a” and insert --σ,--, therefor.

In Column 14, Line(s) 57, delete “a” and insert --σ--, therefor.

In Column 14, Line(s) 66, delete “a” and insert --σ--, therefor.

In Column 15, Line(s) 30, delete “a” and insert --σ--, therefor.

In Column 16, Line(s) 51, after “maintained”, insert --.--.

In the Claims

In Column 20, Line(s) 4, Claim 3, after “update”, delete “a” and insert --the--, therefor.

In Column 20, Line(s) 41, Claim 6, after “both”, delete “,”.

In Column 21, Line(s) 35, Claim 13, after “update”, delete “a” and insert --the--, therefor.

In Column 22, Line(s) 11, Claim 16, after “both”, delete “,”.

Signed and Sealed this
Twenty-eighth Day of February, 2023

Katherine Kelly Vidal

Katherine Kelly Vidal
*Director of the United States Patent and Trademark Office*